US012810315B2

(12) United States Patent
Doumar

(10) Patent No.: US 12,810,315 B2
(45) Date of Patent: Nov. 24, 2026

(54) SYSTEM AND METHOD FOR LINK—INITIATED SECURE VOTING AND REVIEW

(71) Applicant: TapText llc, Coral Springs, FL (US)

(72) Inventor: Steve Doumar, Fort Lauderdale, FL (US)

(73) Assignee: TAPTEXT LLC, Coral Springs, FL (US)

( * ) Notice: Subject to any disclaimer, the term of this patent is extended or adjusted under 35 U.S.C. 154(b) by 0 days.

(21) Appl. No.: 18/655,195

(22) Filed: May 3, 2024

(65) Prior Publication Data

US 2024/0362615 A1 Oct. 31, 2024

Related U.S. Application Data

(63) Continuation-in-part of application No. 18/631,042, filed on Apr. 10, 2024, now Pat. No. 12,657,570, which is a continuation-in-part of application No. 18/593,911, filed on Mar. 3, 2024, now Pat. No. 12,182,794, which is a continuation-in-part of application No. 18/185,993, filed on Mar. 17, 2023, now Pat. No. 11,995,639, which is a continuation of (Continued)

(51) Int. Cl.

| | |
|---|---|
| ***G06Q 30/02*** | (2023.01) |
| ***G06Q 10/40*** | (2026.01) |
| ***G06Q 20/32*** | (2012.01) |
| ***G06Q 20/40*** | (2012.01) |
| ***G06Q 30/0201*** | (2023.01) |
| ***H04W 4/80*** | (2018.01) |

(52) U.S. Cl.
CPC ......... *G06Q 30/0201* (2013.01); *G06Q 10/40* (2026.01); *G06Q 20/3276* (2013.01); *G06Q 20/4014* (2013.01); *H04W 4/80* (2018.02)

(58) Field of Classification Search
CPC .. G06Q 20/3276; G06Q 20/4014; H04W 4/80
See application file for complete search history.

(56) References Cited

U.S. PATENT DOCUMENTS 7,522,715 B1 * 4/2009 Burg .................. H04M 3/2218 379/92.02
8,453,068 B2 5/2013 Stibel et al.

(Continued)

*Primary Examiner* — Scott C Anderson
(74) *Attorney, Agent, or Firm* — GALVIN PATENT LAW LLC; Brian R. Galvin

(57) ABSTRACT

A system and method for link-initiated secure voting and review which employs artificial-intelligence driven technology to ensure both secure voting and meaningful user reviews. Users submit their votes and reviews through a protected interface, leveraging advanced cryptography for data integrity. AI analyzes user reviews, classifies their quality based on metadata and content, and cross-references with user profiles for personalized insights. Following this analysis, the system generates tailored follow-up messages. Positive reviews can trigger appreciation messages, while constructive criticisms prompt acknowledgement and resolution updates. This approach enhances user engagement, refines products/services, and fosters a secure and interactive environment for voting and reviews, all while utilizing AI to deliver pertinent and relevant interactions.

18 Claims, 28 Drawing Sheets

Related U.S. Application Data application No. 17/409,841, filed on Aug. 24, 2021, now Pat. No. 11,610,193, which is a continuation-in-part of application No. 17/360,731, filed on Jun. 28, 2021, now Pat. No. 11,871,308, which is a continuation-in-part of application No. 17/229,251, filed on Apr. 13, 2021, now abandoned, which is a continuation-in-part of application No. 17/209,474, filed on Mar. 23, 2021, now Pat. No. 11,599,916, which is a continuation-in-part of application No. 17/208,059, filed on Mar. 22, 2021, now Pat. No. 11,562,407, which is a continuation-in-part of application No. 17/191,977, filed on Mar. 4, 2021, now abandoned, which is a continuation-in-part of application No. 17/190,260, filed on Mar. 2, 2021, now Pat. No. 11,532,020, which is a continuation-in-part of application No. 17/153,426, filed on Jan. 20, 2021, now abandoned, said application No. 17/360,731 is a continuation-in-part of application No. 17/085,931, filed on Oct. 30, 2020, now Pat. No. 11,055,736, which is a continuation-in-part of application No. 16/693,275, filed on Nov. 23, 2019, now Pat. No. 11,270,354.

(60) Provisional application No. 63/519,562, filed on Aug. 14, 2023, provisional application No. 63/519,559, filed on Aug. 14, 2023, provisional application No. 63/211,496, filed on Jun. 16, 2021, provisional application No. 63/166,391, filed on Mar. 26, 2021, provisional application No. 63/154,357, filed on Feb. 26, 2021, provisional application No. 63/040,610, filed on Jun. 18, 2020, provisional application No. 63/025,287, filed on May 15, 2020, provisional application No. 63/022,190, filed on May 8, 2020, provisional application No. 62/994,219, filed on Mar. 24, 2020, provisional application No. 62/965,626, filed on Jan. 24, 2020, provisional application No. 62/963,568, filed on Jan. 21, 2020, provisional application No. 62/963,379, filed on Jan. 20, 2020, provisional application No. 62/963,368, filed on Jan. 20, 2020, provisional application No. 62/940,607, filed on Nov. 26, 2019, provisional application No. 62/904,568, filed on Sep. 23, 2019, provisional application No. 62/883,360, filed on Aug. 6, 2019, provisional application No. 62/879,862, filed on Jul. 29, 2019.

(56) References Cited

U.S. PATENT DOCUMENTS

| | | | | |
|---|---|---|---|---|
| 9,703,541 | B2 | 7/2017 | Sharifi et al. | |
| 9,892,206 | B2 | 2/2018 | Levy | |
| 11,303,590 | B2 | 4/2022 | Pham | |
| 11,763,334 | B2 | 9/2023 | Sridhar | |
| 2009/0210444 | A1 | 8/2009 | Bailey et al. | |
| 2011/0105213 | A1* | 5/2011 | Irwin, Jr. | G07F 17/3241 101/483 |
| 2016/0092959 | A1* | 3/2016 | Gross | G06Q 30/0625 705/26.62 |
| 2018/0005143 | A1* | 1/2018 | Camargo | H04W 4/80 |
| 2018/0025010 | A1* | 1/2018 | Ramer | H04N 21/251 707/727 |
| 2018/0292092 | A1* | 10/2018 | Bhogal | F24C 7/085 |
| 2018/0332453 | A1 | 11/2018 | Molinet et al. | |
| 2019/0065610 | A1 | 2/2019 | Singh | |
| 2020/0034836 | A1 | 1/2020 | Shah | |
| 2022/0078151 | A1 | 3/2022 | Goenka et al. | |

* cited by examiner

SYSTEM AND METHOD FOR LINK—INITIATED SECURE VOTING AND REVIEW

CROSS-REFERENCE TO RELATED APPLICATIONS

Priority is claimed in the application data sheet to the following patents or patent applications, each of which is expressly incorporated herein by reference in its entirety:

Ser. No. 18/631,042
Ser. No. 18/593,911
Ser. No. 18/185,993
Ser. No. 17/409,841
Ser. No. 17/360,731
Ser. No. 17/229,251
63/166,391
Ser. No. 17/209,474
Ser. No. 17/208,059
Ser. No. 17/191,977
Ser. No. 17/190,260
Ser. No. 17/153,426
62/965,626
62/963,368
62/963,379
63/040,610
63/025,287
63/022,190
62/994,219
63/154,357
Ser. No. 17/085,931
62/963,568
62/940,607
Ser. No. 16/693,275
62/904,568
62/883,360
62/879,862
63/211,496
63/519,559

BACKGROUND OF THE INVENTION

Field of the Art

The disclosure relates to the field of computer-based communication systems, and more particularly to the field of ecommerce and security.

Discussion of the State of the Art

A common problem in the industry of customer engagement and retention is the challenge of re-engaging users who have shown initial interest in a product, service, or app but have not been active for a while. This phenomenon is often referred to as “user churn” or “user attrition.” It’s a concern for businesses because acquiring new customers can be more costly than retaining existing ones. Therefore, finding effective ways to re-engage inactive users and bring them back into the fold is crucial for maintaining a healthy customer base.

What is needed is a system and method for link-initiated secure voting and review which can use artificial intelligence systems analyze user submissions and generate personalized follow-up messages.

SUMMARY OF THE INVENTION

Accordingly, the inventor has conceived and reduced to practice, a system and method for link-initiated secure voting and review which employs artificial-intelligence driven technology to ensure both secure voting and meaningful user reviews. Users submit their votes and reviews through a protected interface, leveraging advanced cryptography for data integrity. AI analyzes user reviews, classifies their quality based on metadata and content, and cross-references with user profiles for personalized insights. Following this analysis, the system generates tailored follow-up messages. Positive reviews can trigger appreciation messages, while constructive criticisms prompt acknowledgement and resolution updates. This approach enhances user engagement, refines products/services, and fosters a secure and interactive environment for voting and reviews, all while utilizing AI to deliver pertinent and relevant interactions.

According to a first preferred embodiment, a system for link-initiated secure voting and review is disclosed, comprising: a first trained machine learning algorithm configured to analyze the content of a user review to determine a sentiment score; and a computing device comprising a processor, a memory, and a first plurality of programming instructions stored in the memory and operable on the processor, wherein the first plurality of programming instructions, when operating on the processor, cause the computing device to: receive a user interaction from a mobile device substantially corresponding to a call-to-action and a mobile device metadata; authenticate an identity of a user of the mobile device using a verification rule associated with the call-to-action; responsive to user authentication, generate a redirect comprising a deep link and a payload, wherein the redirect is configured to auto-populate a message on a messaging application on the mobile device; receive a user review message from the mobile device; use the user review and the mobile device metadata as inputs into the first trained machine learning algorithm to determine a sentiment score associated with the user review; and send a follow-up message to the mobile device based on the sentiment score.

According to a second preferred embodiment, a method for link-initiated secure voting and review is disclosed, comprising the steps of: training a first machine learning algorithm configured to analyze the content of a user review to determine a sentiment score; receiving a user interaction from a mobile device substantially corresponding to a call-to-action and a mobile device metadata; authenticating an identity of a user of the mobile device using a verification rule associated with the call-to-action; responsive to user authentication, generating a redirect comprising a deep link and a payload, wherein the redirect is configured to auto-populate a message on a messaging application on the mobile device; receiving a user review message from the mobile device; using the user review and the mobile device metadata as inputs into the first trained machine learning algorithm to determine a sentiment score associated with the user review; and sending a follow-up message to the mobile device based on the sentiment score.

According to an aspect of an embodiment, the call-to-action is associated with a voting event or user review process.

According to an aspect of an embodiment, a second trained machine learning algorithm configured to analyze the content of a user review to determine a positivity score; and wherein the computing device is further configured to use the user review and the mobile device metadata as inputs into the second trained machine learning algorithm to determine a positivity score associated with the user review.

According to an aspect of an embodiment, a third trained machine learning algorithm configured to generate the follow-up message; and wherein the computing device is further configured to: use the user review, the mobile device metadata, the sentiment score, and the positivity score as inputs into the third trained machine learning algorithm to generate the follow-up message.

According to an aspect of an embodiment, further comprising a number generator comprising a second plurality of programming instructions stored in the memory and operable on the processor, wherein the first plurality of programming instructions, when operating on the processor, cause the computing device to: generate a unique identifier associated with the mobile device; combine the unique identifier with a pre-defined format to generate a unique toll-free number; and wherein the payload comprises the generated unique toll-free number.

According to an aspect of an embodiment, the payload comprises a ready-to-send user review.

According to an aspect of an embodiment, the payload comprises a ready-to-send vote.

According to an aspect of an embodiment, a fourth trained machine learning algorithm configured to classify a quality of the user review.

According to an aspect of an embodiment, wherein the user review and mobile device metadata, the sentiment score, and the positivity score are used as inputs into the fourth trained machine learning algorithm to classify the quality of the user review.

According to an aspect of an embodiment, the follow-up message is further based on the quality of the user review.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary and are not to be considered as limiting of the scope of the invention or the claims herein in any way.

DETAILED DESCRIPTION OF THE DRAWING FIGURES

Figure 1:
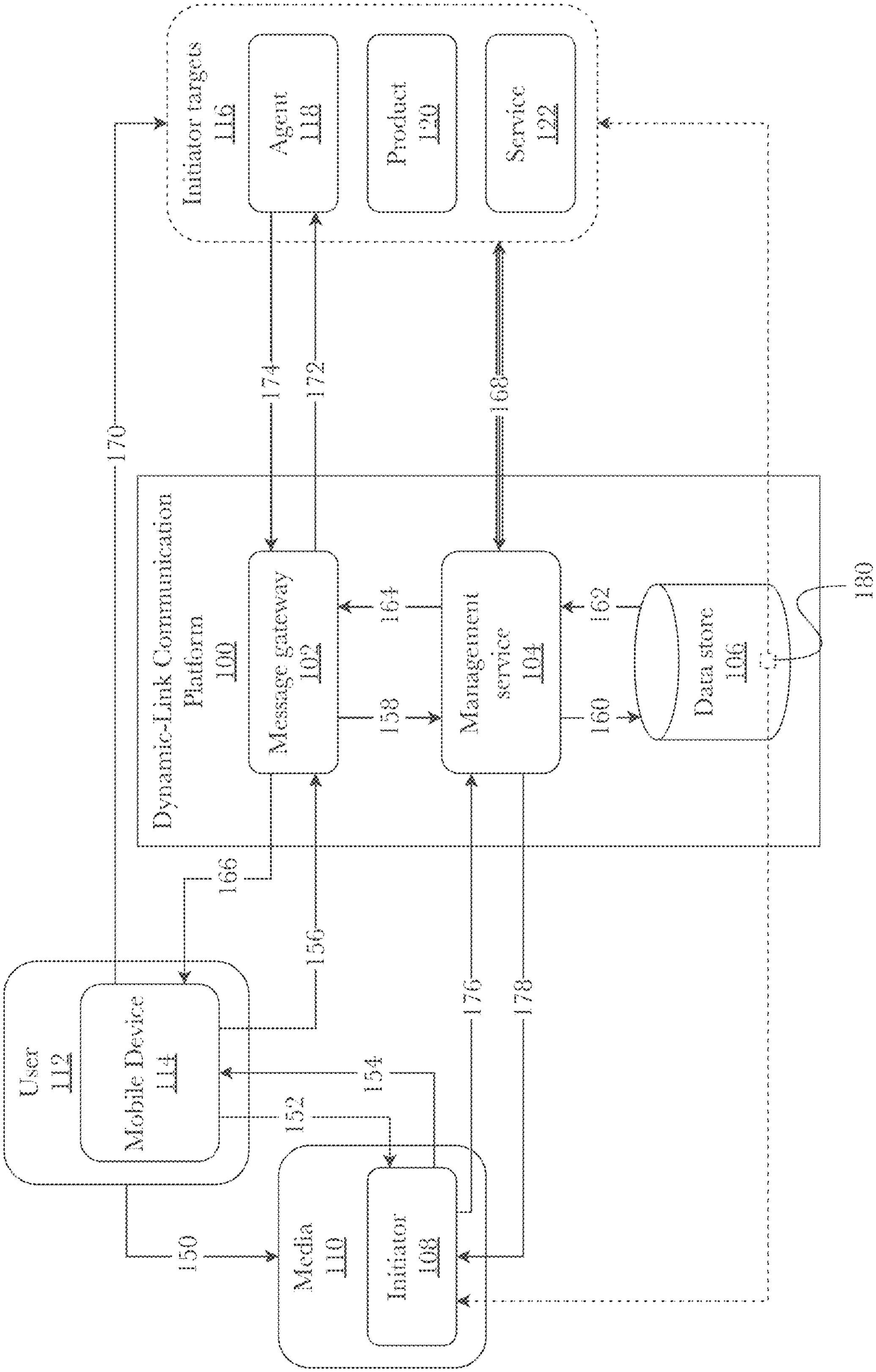
FIG. 1 is a block diagram illustrating an exemplary system architecture for a dynamic-link communication platform.

The inventor has conceived, and reduced to practice, a system and method for link-initiated secure voting and review which employs artificial-intelligence driven technology to ensure both secure voting and meaningful user reviews. Users submit their votes and reviews through a protected interface, leveraging advanced cryptography for data integrity. AI analyzes user reviews, classifies their quality based on metadata and content, and cross-references with user profiles for personalized insights. Following this analysis, the system generates tailored follow-up messages. Positive reviews can trigger appreciation messages, while constructive criticisms prompt acknowledgement and resolution updates. This approach enhances user engagement, refines products/services, and fosters a secure and interactive environment for voting and reviews, all while utilizing AI to deliver pertinent and relevant interactions.

Voting via redirect can refer to a process where voters are redirected to a specific website, platform, or service to cast their votes in an election, poll, survey, etc. This can involve using an initiator (e.g., a QR code or a deep link) to direct voters to a designated voting portal where they can make their selections. This may be used to facilitate remote or online voting, allowing individuals to participate in elections or polls without having to physically visit a polling station. It can potentially streamline the voting process, make it more accessible, and increase voter participation.

There are numerous systems and contexts in which votes or surveys from users can play an important role including, but not necessarily limited to, elections, market research, employee feedback, customer satisfaction, product development, educational feedback, healthcare, public opinion, entertainment and media, social research, urban planning, non-profit organizations, community decision-making, event planning, website feedback, travel and hospitality, public services, and environmental initiatives. Political elections involve citizens casting votes to choose their representatives at various levels of government. Businesses use surveys to gather opinions from customers about products, services, and market trends to inform their strategies. Organizations conduct surveys to collect feedback from employees on various aspects of the workplace, such as job satisfaction, company culture, and work-life balance. Companies often use surveys to gauge customer satisfaction and gather insights into the quality of their offerings and customer support. Software and product developers might conduct surveys to gather user preferences and requirements to guide the development process. Educational institutions use surveys to collect feedback from students about courses, instructors, and overall educational experiences. Patient satisfaction surveys help healthcare providers understand the quality of care and identify areas for improvement. Governments and organizations conduct public opinion polls to gather insights on various topics, including policies and social issues. TV networks and streaming platforms may use audience voting to influence content, such as reality show outcomes. Surveys are used by sociologists and researchers to study social attitudes, behaviors, and trends. Local governments may seek citizen input through surveys on topics like urban development, infrastructure, and transportation. Nonprofits often use surveys to gather feedback from beneficiaries and supporters to improve their programs and services. Communities may conduct surveys or votes to make decisions on local projects, budgets, or regulations. Event organizers may ask attendees to vote on aspects like event themes, activities, and guest speakers. Online businesses may gather user opinions on website usability, design, and functionality through surveys. Surveys can help assess public support for conservation efforts and sustainability initiatives. These are just a few areas and use cases where the ability to securely collect user feedback is vital to the downstream processes and decision making.

Deep links and uniform resource identifiers (URIs) are closely related concepts, as deep links are a specific type of URI used to navigate to a specific location or content within a mobile application or website. URIs are strings of characters that identify a name or resource on the Internet. They are used to locate and access resources, whether they are web pages, files, or other types of data. URIs include two main subsets: URLs (Uniform Resource Locators) and URNs (Uniform Resource Names).

Deep linking is a technique used in software development, especially in the context of mobile applications (App) and websites, to direct users to specific content within an app or website, rather than just the homepage or main screen. It allows seamless navigation between different sections or pages of an app/website, even when the user clicks on a link from outside the app/website. The traditional approach to linking often results in opening a new browser tab or directing users to the homepage of an app, which can be frustrating for users when they want to access a specific piece of content. Deep linking solves this problem by providing a URL that points directly to the desired content, even if it's within a specific page or section of an app.

There are two main types of deep linking: traditional deep linking and universal deep linking. Traditional deep linking involves creating custom URLs that can open a specific section or content of an app directly. When users click on a deep link, it triggers the app to open (if installed on the device) and takes them to the designated page within the app. Universal deep links work across different platforms and handle scenarios where the app is not installed. When users click on a universal deep link, it first checks if the app is installed on the device. If it is, the app opens to the specific content; if not, the link redirects the user to a fallback web URL, ensuring a seamless user experience even without the app. Implementing deep linking requires proper handling within the app and website, as well as support from the operating systems (for mobile apps) and web browsers (for websites) to recognize and process the deep links correctly. Developers often use URL schemes (for traditional deep linking) or App Links (for universal deep linking on Android) and Universal Links (for universal deep linking on iOS) to set up deep linking functionality in their applications.

A common problem in the field of customer engagement and retention is the challenge of re-engaging users who have shown initial interest in a product, service, or app but have not been active for a while. Deep links can provide an avenue towards a solution for this problem by enabling personalized and contextually relevant re-engagement strategies. Deep links can help address the issue of user churn and improve customer engagement and retention. For instance, deep links allow the system to create customized re-engagement campaigns that target specific user segments based on their past interactions, preferences, and behavior. For instance, if a user had abandoned their shopping cart, a deep link could lead them directly back to their cart, along with a special offer to incentivize them to complete the purchase. Deep links can be used to deliver personalized offers, discounts, or content that resonate with the user's previous interactions. By providing value and relevance, the system can entice users to return and engage with the app or website. In addition, deep links can guide inactive users to specific features or sections of an app or website (and/or product/event) that align with their interests. This direct access makes it easier for users to re-engage with the content they find most appealing.

The system and method may utilize temporal context and multi-channel re-engagement strategies. For example, deep links can be integrated into time-sensitive promotions, encouraging users to take immediate action. What's more, deep links can be shared across various communication channels, including emails, SMS, push notifications, and social media. This allows the system to reach out to inactive users through their preferred channels, increasing the likelihood of re-engagement. Deep links can also track user interactions and behaviors after re-engagement, providing valuable insights into the effectiveness of different re-engagement strategies. This data can be used to refine and optimize future campaigns.

By leveraging deep links to create targeted and personalized re-engagement strategies, the system and method can rekindle interest among inactive users and encourage them to become active and engaged customers once again. The ability to guide users directly to relevant content or features increases the chances of successful re-engagement, contributing to improved customer/user retention rates.

In various implementations of the system and methods described herein, a custom-generated deep link may be implemented in a text message auto-populated within a text messaging application operating on a mobile device, wherein the deep link is associated with an initiator which is linked to a specific event, promotion, verification event, and/or action. In some embodiments, when the same mobile device interacts with an initiator for a second time a server may receive the second initiator interaction and deliver a different result (e.g., deep link) than the first initiator interaction.

According to at least one aspect of an embodiment, the system and methods described herein may comprise a rules engine configured to process a second (or subsequent) initiator scan by a user of a mobile device and select an appropriate response based on various contextual data and/or metadata associated with either a first or the second (or subsequent) initiator scan. According to the aspect, rules engine may comprise one or more databases for storing various rules which can be used for routing and/or message response generation. Rules engine may be configured to create a custom-generated deep link that is responsive to a user's interaction with an initiator. Rules engine may be further configured to receive, retrieve, derive, infer, or otherwise obtain relevant contextual, or metadata associated with the user, the user's mobile device, or both. This data helps in tailoring the deep link (or other type of information that can be communicated to a user responsive to a second initiator scan) to provide a personalized and seamless experience for the user.

In some embodiments, contextual data may include (but is not limited to) user profile information, previous (i.e., historical) interactions, initiator target information, purchase history, search queries, device information, referral source (i.e., initiator), time and context of action, personal preferences, push notification interaction, and session context, to name a few. Information about the user's profile, such as their name, gender, location, language preferences, and user ID, can be used to create personalized content (e.g., deep links). For instance, a deep link could direct the user to content or offers specific to their location or language. Data on the user's previous interactions within the app or website can be valuable for creating deep links that lead them to relevant content they have engaged with in the past. For example, if the user was browsing specific products or articles, the deep link can take them back to those pages. If the user has made previous purchases, deep links can be customized to offer related products or discounts, encouraging repeat purchases. Information about the user's recent search queries can help create deep links that lead them to search results or suggested content related to their interests. Details about the user's device type (e.g., mobile, tablet, desktop) and operating system (e.g., iOS, Android, Windows) can be used to generate deep links that are compatible with their device. If the user arrived at the app or website through a specific referral source (e.g., social media, email campaign, QR code), the deep link can be customized to acknowledge the source and offer relevant content or promotions. The time of day and the context in which the user initiated the action can be considered while generating deep links. For example, if the user scanned a QR code at a particular event, the deep link could direct them to event-specific information or offers. Data about the user's preferences, such as favorite categories, genres, or topics, can be used to customize deep links that match their interests. If the user interacts with a push notification, the deep link can lead them to a relevant section of the app or website based on the notification content. Information about the user's current session, such as items in their shopping cart or content in progress, can be used to create deep links that resume their previous activity. By leveraging this contextual data, the disclosed system and methods can create deep links that deliver a highly personalized experience for users, increasing the likelihood of engagement and conversion.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture for a dynamic-link communication platform 100. Dynamic-link communication platform 100 links an initiator 108 with some type of content or call-to-action associated with a target product or service 116. An initiator 108 may take on many forms, a preferred form being a QR code, however other forms are anticipated in a non-exhaustive list in FIG. 8. The content served may also take many forms, a preferred form being a text or URL associated with a product 120 or service 122, however other forms are anticipated in a non-exhaustive list in FIG. 6. Actions are typically, but not limited to, communicating with some type of agent 118, be it a sales agent, technical support agent, or other types of representatives.

Initialization of dynamic-link communication platform 100 comprises storing content and rules associated with a product 120 or service 122 in some form of computer memory 106, i.e., in a database, federated data store, or distributed ledger, etc. The content and rules are assigned an initiator ID that is unique to that product 120 or service 122 and everything related to that product 120 or service 122 (e.g., content, rules, initiator ID, etc.) is called a campaign 180. The initiator ID may be autogenerated by an algorithm, or taken sequentially from a list, or other methods known to those in the art. Additionally, neither the content nor the rules together are a requirement, but each campaign must have at least one or the other or both. For example, a campaign for a product sold online may have no rules and the only content is a URL to the product page for that product. Or in another example, a marketing campaign attempting to get users 112 to speak to a sales representative may have only a set of rules that forward the user's 112 phone number to a phone number of the business. However, in some situations, there may be content and rules, whereby it may be possible to only forward the content based on some part of the user's 112 metadata embedded in the auto-populated message.

Other rules may comprise routing instructions or routing logic and may further use Artificial Intelligence ("AI") techniques known to those skilled in the art including deep learning algorithms and incorporate data resources as listed in previous paragraph along with an array of other factors including but not limited to time-of-day, day-of-week, store hours, resource availability, service level requirements, previous customer interaction and transactions, customer tiering structure, data from 3rd party systems including but not limited to CRM systems, location-based services, weather-services and so forth.

With a unique initiator ID for a product 120 or service 122 in place, an initiator 108, such as a QR code, may be generated. It is not necessary to always generate the initiator 108 with a dynamic-link communication platform 100. According to one embodiment, initiators 108 may also be received alongside the content and rules. Generated initiators 108 may be sent, forwarded, printed, mailed, or hosted on some form of media 110. Media 110 in this sense is referring to the many forms that an initiator may be placed. A non-exhaustive list includes printed materials such as billboards, posters, and flyers; and electronic means such as online advertisements, embedded advertisements, URLs, push notifications, streaming media, etc.

With the dynamic-link communication platform 100 initialized, a user 112 will observe 150 media 110 with an initiator 108, use his or her device—such as a mobile device 114—to engage 152 with an initiator 108, for example scanning a QR code, which will trigger the device 114 to auto-populate a text message 154. The user 112 will simply press the send key/button to send the message 156. In the case the initiator 108 is a QR code, then the destination of the message and other data may be embedded in the QR code such that the embedded data is then transferred along with the message to the dynamic-link communication platform 100 so that the dynamic-link communication platform 100 knows the context in which the message was sent. In almost every case there may be a way two derive context from a message. Take for example, three billboards all directed to the same product 120/campaign but each containing a different phone number, where the phone number is the initiator 108 and shares the same initiator ID. In this case a user will dial the phone number and be returned the content (e.g., a text message with the product information)

and the number that was dialed gives context as to the location of the billboard and the user 112. In a case where the media 110 does not allow for context, but the initiator 108 has Internet access, the initiator 108 may communicate 176/178 with the management service component 104 of a dynamic-link communication platform 100 in order to provide context as well as deliver and confirm compliance with rules if applicable.

The message sent 156 from the device 114 is received by a message gateway 102 and forwarded 158 onto a management service 104. The message gateway 102 receives and sends messages from various modes of communication, e.g., text, email, voice, and other protocols. The initiator ID contained in the message is used to query 160 a data store 106 which will return 162 any content and rules associated with that initiator ID. Upon compliance with any rules, and if there is content to be delivered back to the device 114, then the content is sent 164 to the message gateway 102 for sending 166 back to the device 114. If the message was a request to communicate with an agent 118, then upon compliance with any rules, the message or content will be sent to the message gateway 102 for delivery 172 to the agent 118. The agent 118 if applicable, will send a return message 174, and that return message will again go to the management service 104 for rule compliance before being delivered to the device 114. Some content to be delivered to the device will contain external links 170 to the products 120 and services 122. Content, rules, and provided initiators 108 may be dynamically updated via communication lines 168 with the initiator targets 116. For example, if the URL to a product changes, the product owner may push updated content to replace the old content in the data store 106.

In some embodiments, platform 100 may store information associated with a user/mobile device history of interactions with platform 100 and/or various initiators 108 in a suitable database 106. For example, a record/profile may be established and associated with a mobile device (e.g., using a device identifier such as a mobile telephone number, Apple's IDFA for iOS devices, Google Advertiser ID for Android devices, International Mobile Equipment Identity, Media Access Control, etc.) comprising historical interaction data such as previous initiators the device/user has interacted with, metadata associated with each such interaction (e.g., time, location, device state, etc.), and outcomes associated with the interaction. In some aspects, outcomes associated with an interaction may comprise information related to: purchase history and whether or not the user made a purchase or subscribed to a service if the initiator is associated with a product or service; if a purchase/subscription was made for a different product/service than what was associated with the initiator, but was a result of the user being directed to the product via the initial deep link; user engagement with a product/service (e.g., how long the user stayed on the deep linked website/application); and user sentiment (which may be derived using natural language processing and/or understanding artificial intelligence systems and any subsequent messages/metadata exchanged between the user mobile device and platform 100). In some implementations, the content served to a mobile device 114 (e.g., via an auto populated message in a messaging application) responsive to the mobile device interacting with an initiator 108 may be based in part on such a record/profile and the information contained therein.

Customers/users and their devices 114, agents 118, 177 and their business user mobile device(s), other business user device(s), and TCPA compliant mobile device(s) used by agents 118, may connect to a dynamic-link communication platform 100, typically via a cellular phone network, although connections may be made through other means, as well, such as through the Internet via a Wi-Fi router for example. Similarly, devices may connect to over a Local Area Network ("LAN") or Wide Area Network ("WAN"), the Internet, a direct physical connection to another device, or some other network connection. Dynamic-link communication platform system 100 may connect to 3rd party or external systems or components, such as Customer Relationship Management ("CRM") systems, Private Branch Exchange ("PBX"), traditional telephony call center agents, voicemail systems, and so forth, through 3rd party data gateway.

Figure 2:
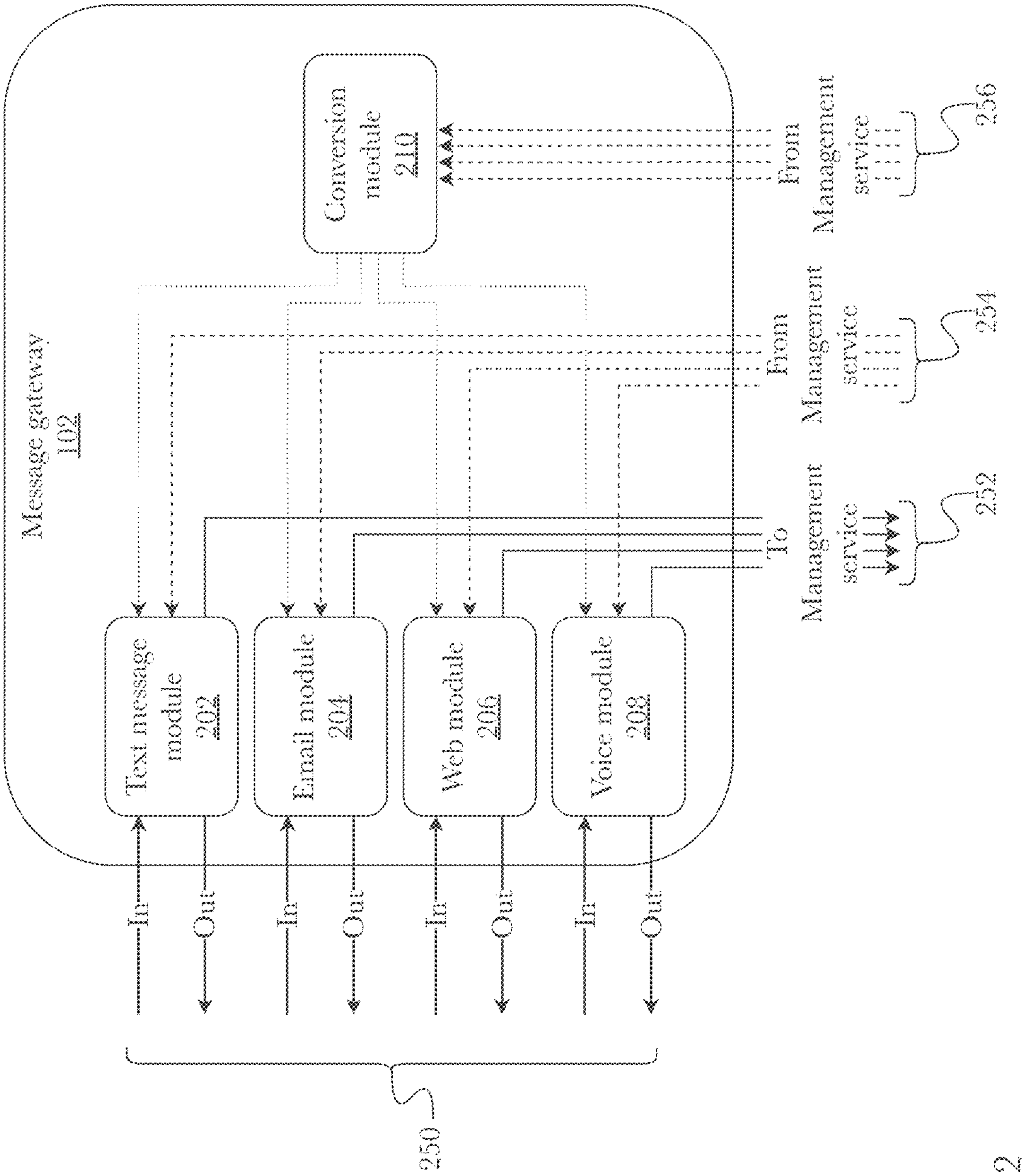
FIG. 2 is a block diagram illustrating an exemplary architecture for message gateway.

FIG. 2 is a block diagram illustrating an exemplary architecture for message gateway. The message gateway 102 may comprise various modules 202-208 which send and receive 250 different modes of communication. A conversion module 210 may be implemented which is dedicated to converting between different modes of communication. However, the arrangement of these modules and their inherent functions need not be arranged in the manner illustrated in FIG. 2. Another anticipated embodiment employs third-party gateway services where and if possible, such as an SMS-to-email gateway, however it may be more efficient to centrally perform the conversions, especially with regard to privacy.

Messages received 250 by the modules are sent to management service 252. The returned content or response messages from the management service may already be formatted in the proper format for the respective module 254. Returned content or response messages not properly formatted 256 may get formatted by the conversion module before going out to the proper module 202-208.

Figure 3:
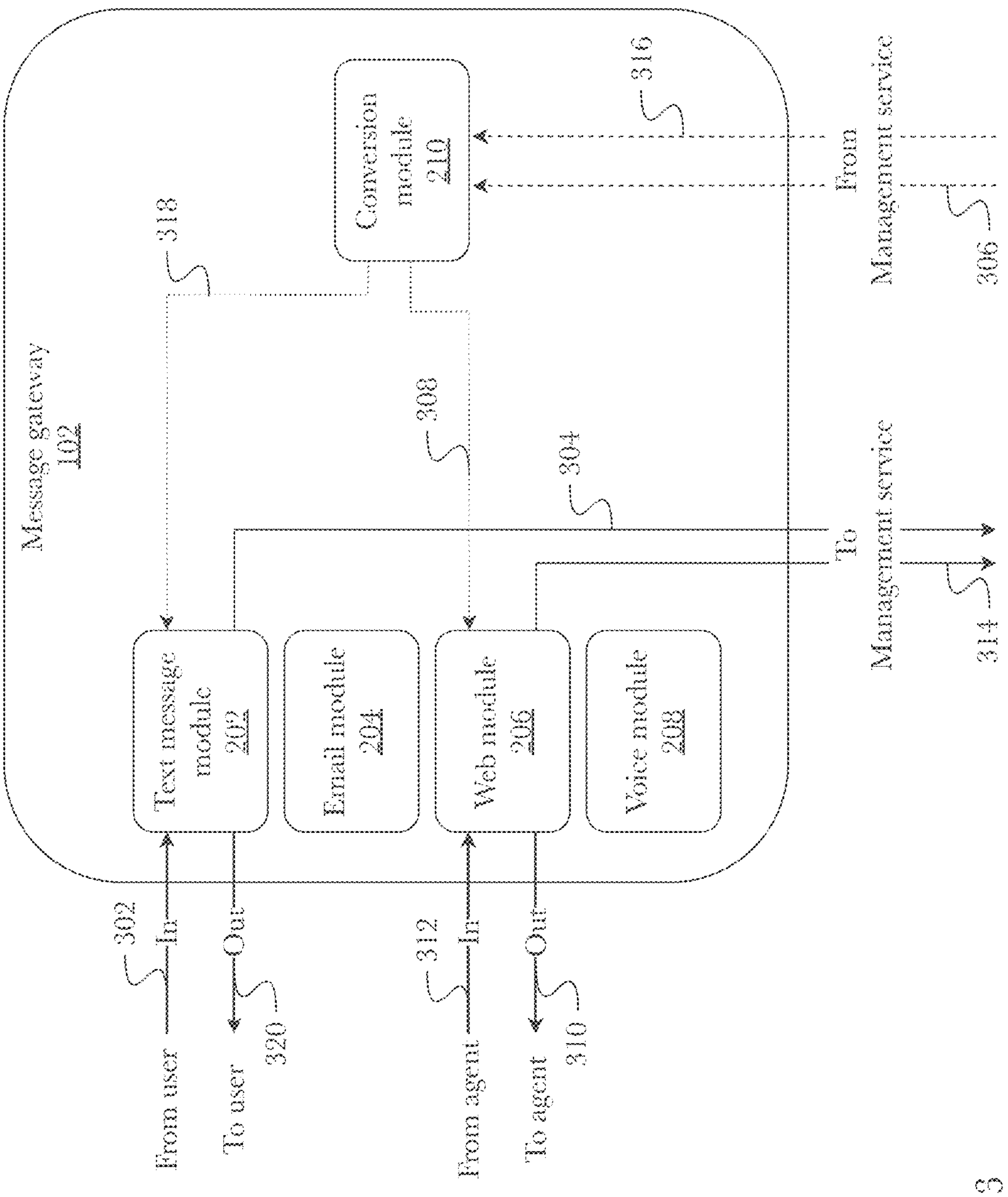
FIG. 3 is a block diagram illustrating an exemplary use of a message gateway.

FIG. 3 is an example of a user engaging with an initiator that is intended to connect the user with a sales agent using a web-enabled chat interface. A user will interact with an initiator and then send the generated message which will be received 302 by a text message module 202. The text message module 202 may contain instructions to send and receive wireless protocols typically used for mobile devices such as SMS, MMS, iMessage, RCS, etc. The message is sent to the management service 304 where the initiator ID from the message will identify the campaign and subsequently at least one or more agents to query if they may respond to the request. The rules of the campaign may set forth what content the message to the agent contains. For example, the first message may just contain a query to approve or deny the request. According to another embodiment, the original message plus any metadata about the user or request may be slotted into an agent's queue. Many possibilities exist as to what the messages may contain and are not limited to the examples set forth herein. Irrespective of what the messages may contain, a message is sent to an agent 308/310 via the web module 206, however not before the text message is converted into the appropriate format 306 for the web module 206. The response from the agent 312 is sent to the management service for rule compliance 314 and then back 316 to the message gateway 102 conversion module 210 so that it may be converted into a text format to be set to the user 318/320.

Figure 4:
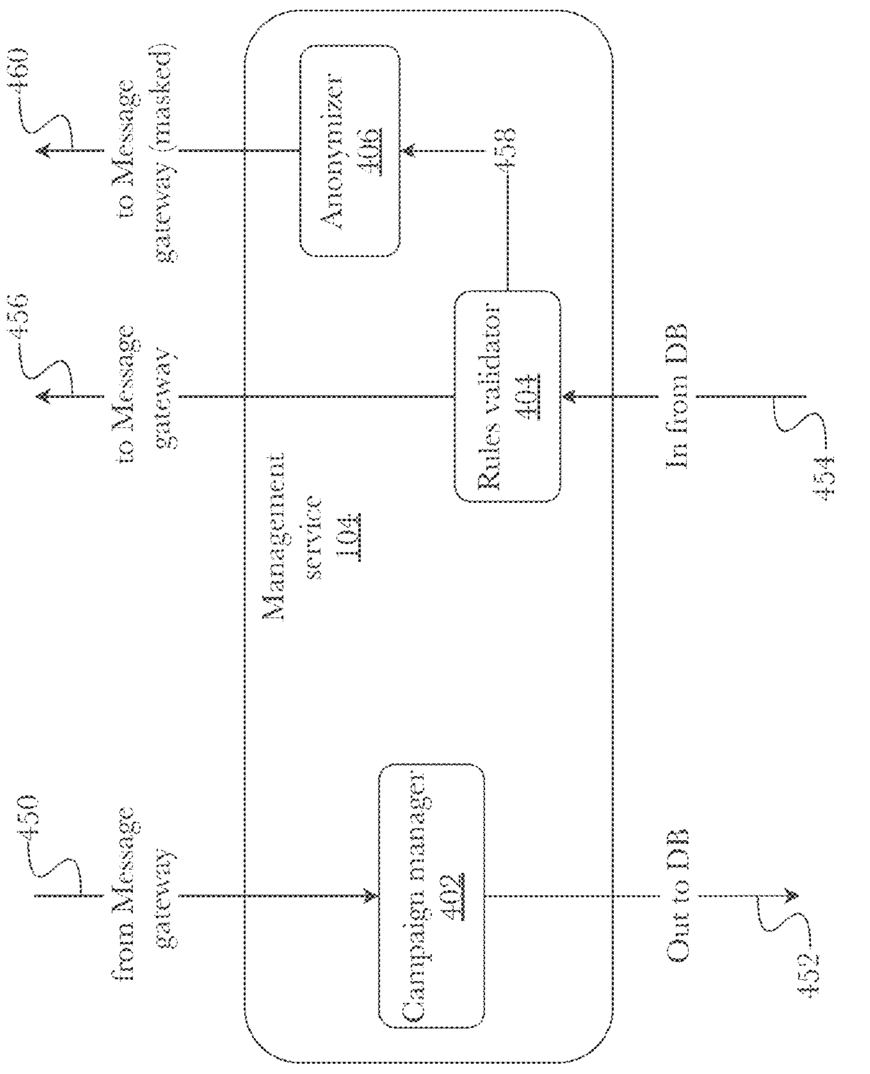
FIG. 4 is a block diagram illustrating an exemplary architecture for a management service.

FIG. 4 is a block diagram illustrating an exemplary architecture for a management service 104. Messages from the message gateway are received 450 by the management service 104 and a campaign manager 402 uses the message initiator ID to retrieve the associated content and rules from one or more databases 452/454 and sends the rules to a rules validator 404. If there are no rules and only content to be served, then the content will simply be sent out to the message gateway 456. If a campaign from the one or more databases does contain one or more rules however, the rules validator 404 ensures that all the requirements of the campaign are met before sending the content or executing a specific action is performed. One example is that a rule may dictate that the message be stripped of private information before it is forwarded or used, and in such a case, the message will be sent to an anonymizer 406 before the message is sent 458 to the message gateway 460. The anonymizer 406 removes personally identifiable information (PII) from messages using machine learning algorithms such as natural language processing or natural language reasoning. Rules may go as far as being employed to prescreen the source of the message using the metadata embedded into the message as a way to discriminate whether or not the contents of the campaign may be allowed to be sent to the message sender.

Figure 5:
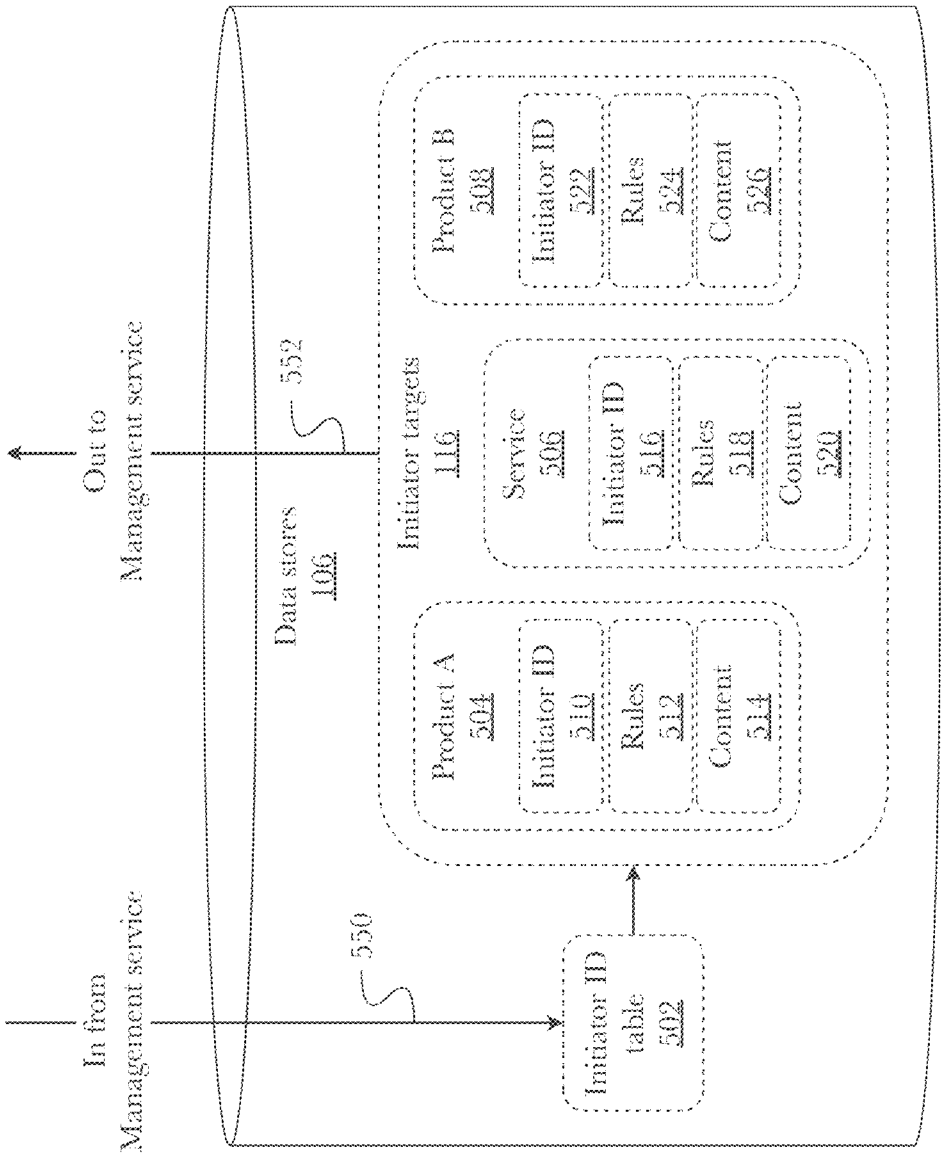
FIG. 5 is a block diagram illustrating exemplary data within one or more data stores.

FIG. 5 is a block diagram illustrating exemplary data within one or more data stores 106. This diagram illustrates an exemplary logical representation of one way to organize and store data associated with an initiator in one or more data bases. In this arrangement an initiator ID table 502 stores a list of initiator IDs, each of which are linked with a memory address associated with each initiator target 116, i.e., campaign 504-508, in the data store. In this way, content and rules may be efficiently retrieved from the management service 550/552. According to this embodiment, each campaign 504-508 has at least their own set of rules 512/518/524, content 514/520/526, and an initiator ID 510/516/522.

Database(s) 106 may take the form of a managed or unmanaged database, document-oriented database system, or a Structured Query Language ("SQL") database. Examples of types of database software that may operate include MYSQL™, ORACLE DATABASE™, MONGODB™, and others. It may exist as a distinct physical device or be operating on another computing device that may perform other functions aside from operating, hosting and serving the database 106. If it is a distinct physical device, the database may be connected over a LAN or WAN, the Internet, a direct physical connection to another device, or some other network connection.

Figure 12:
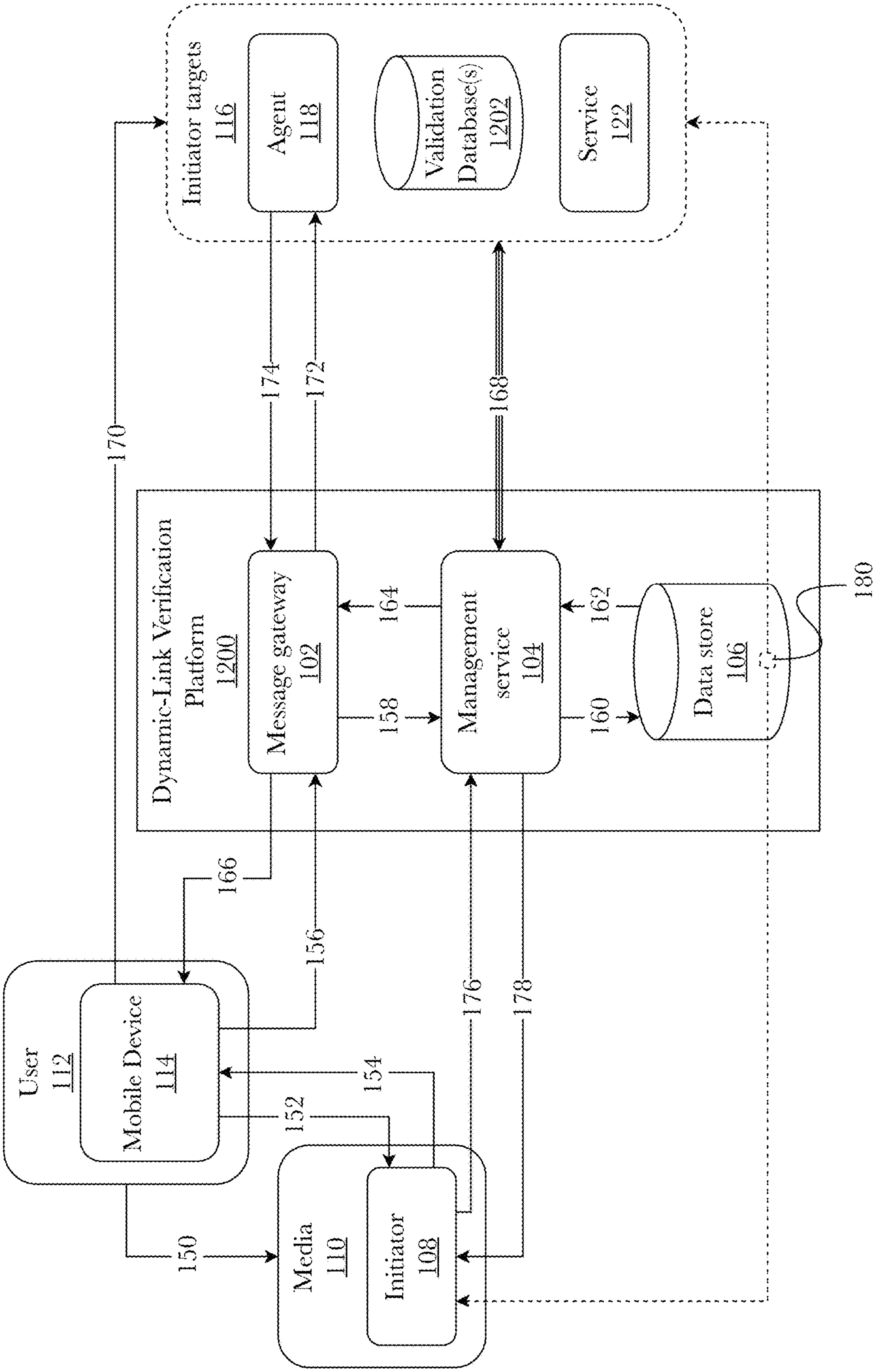
FIG. 12 is a block diagram illustrating an exemplary system architecture for a dynamic-link verification platform.

FIG. 12 is a block diagram illustrating an exemplary system architecture for a dynamic-link verification platform 1200. A dynamic-link verification platform 1200 functions in much the way of a dynamic-link communication platform 100 in FIG. 1. However, one or more validation databases 1202 have taken the place of a product for use in authorizing individuals at business establishments, public parks and venues, and other places where authorization/validation may be utilized. In general, a user 112 attempts to conduct an ecommerce transaction or attempts to enter a controlled space. In both scenarios, an initiator 108 may be presented to the user 112 so that the mobile device 114 may interact with the initiator 108 whereby the initiator 108 triggers the mobile device 114 to auto-populate a text message relating to the ecommerce transaction or the request to gain entry into the controlled space. It is possible that more than one initiator 108 is present such as the case if there are multiple events at one venue, and other like-situations. The mobile device 114 sends the auto-populated text message and it is received by the message gateway 102. The text messages forwarded on to the management service 104 where the initiator ID is used to retrieve a rule relating to the e-commerce transaction or request for entry, or as defined hereafter a verification event. The rule contains instructions for the management service 104 to perform in order to verify the owner of the mobile device 114. Rules may comprise various instructions, some of which are disclosed in the following examples.

A first example may be used at a concert and requiring users to have full vaccination status against a coronavirus in order to gain entry. The instructions contained in the rule in this scenario may be to use the phone number of the mobile device 114 against the billing information associated with the mobile device's 114 carrier to determine the name of the user 112. Subsequently, use the name on the billing information against the CDC's vaccination whitelist. Then, contingent on the successful verification of the first two steps, compare the name of the vaccinated user against the guest list provided by the verification event host. Lastly, send an approval notification to the event host. It should be noted that the event host is not a person, but may be another electronic device which may unlock a gate, send a message, activate the printer, complete a transaction, etc.

A second example may be an ecommerce transaction where in the consumer is attempting to purchase alcohol that is restricted to anyone under the age of 21 years old. The instructions in this scenario may require the user to provide biometrics on the mobile device 114 and use the biometrics to compare against a government database.

According to one use case, a consumer may go to an ecommerce website to purchase a product or service that requires his or her identity to be verified. On the product page 110 for that ecommerce item, there may be a selectable item—i.e., an initiator 108—such as a link or a button that may say something to the effect of "verify" or something of the like. When the consumer 112 interacts with this initiator 108, a message will be auto-generated on their mobile device 114. The message destination will go to a dynamic link verification platform 1200 so that the management service 104 can first check any local data stores 106 to see if the validation may be confirmed, and if not reach out to one or more validation databases 1202 over a network. Validation of the user 112 of the mobile device 114 may happen in the following non-exhaustive list of examples: a third-party reverse lookup service matching the phone number to the consumer's name; matching some or all of the billing information of the mobile device to the consumer's name; using APIs of other third-party verification databases, or using verification methods present on the mobile device—e.g., biometrics, security applications, and partner applications. According to one embodiment the data store 106 may be used to store the user's 114 validation status. In this way, a data store 106 may build up a list of users who are pre-verified and to what extent they are pre-verified. According to one aspect, a distributed ledger may provide a private and secure means to store such a pre-verified list of users. Upon verification of a user's identity, the dynamic-link verification platform 1200 may send an approval to the ecommerce provider so that the transaction may be completed.

An additional use case may be using a validation platform 1200 to control entry into a public place, event, or venue based upon the condition that the individual has the appropriate vaccines. The management service 104 may reach out to a federated database comprising databases such as the CDC, hospital chains, etc. It may use the same local data store 106 and distributed ledger as mentioned previously. There may be multiple levels of validation depending on the context of the situation. For example, it is possible that a user has all of his or her vaccines and it is recorded as much in a database and upon a validation request, the user is verified as green, signifying that the user may attend the current and all future events contingent on the fact that the rules don't change regarding what vaccinations are required period. However, consider a second person who is also fully vaccinated, but their vaccination information has yet to be uploaded to any database. This person may be manually verified by a person working the gate at a public event, such that after manual verification, the user's status may be stored in the local database 106 as yellow, signifying that they are only validated this one time and they must be validated again the next time they visit any establishment. It may be also that a user is not able to be manually or automatically verified according to their vaccination status, therefore a user 112 requesting to get in using their mobile device 114 and engaging with an initiator 108 would be denied entry and would be flagged as red signifying that they are not allowed entry into the event. The different verification levels—green, yellow, and red—may be used to print out wristbands of different colors, or provide different information in the form of a text message to the mobile device. The different statuses may be used to control what areas of the venue the person is allowed to be at. For example, at a restaurant, a user with a green status may be able to dine indoors while users with only a yellow status may only dine outdoors. With regards to providing different information in the form of a text message, keep in mind that the dynamic link verification platform 1200 has the capabilities to store that information and provide it upon receiving the auto-populated text message from the mobile device 114, as disclosed in at least FIG. 1.

Figure 14:
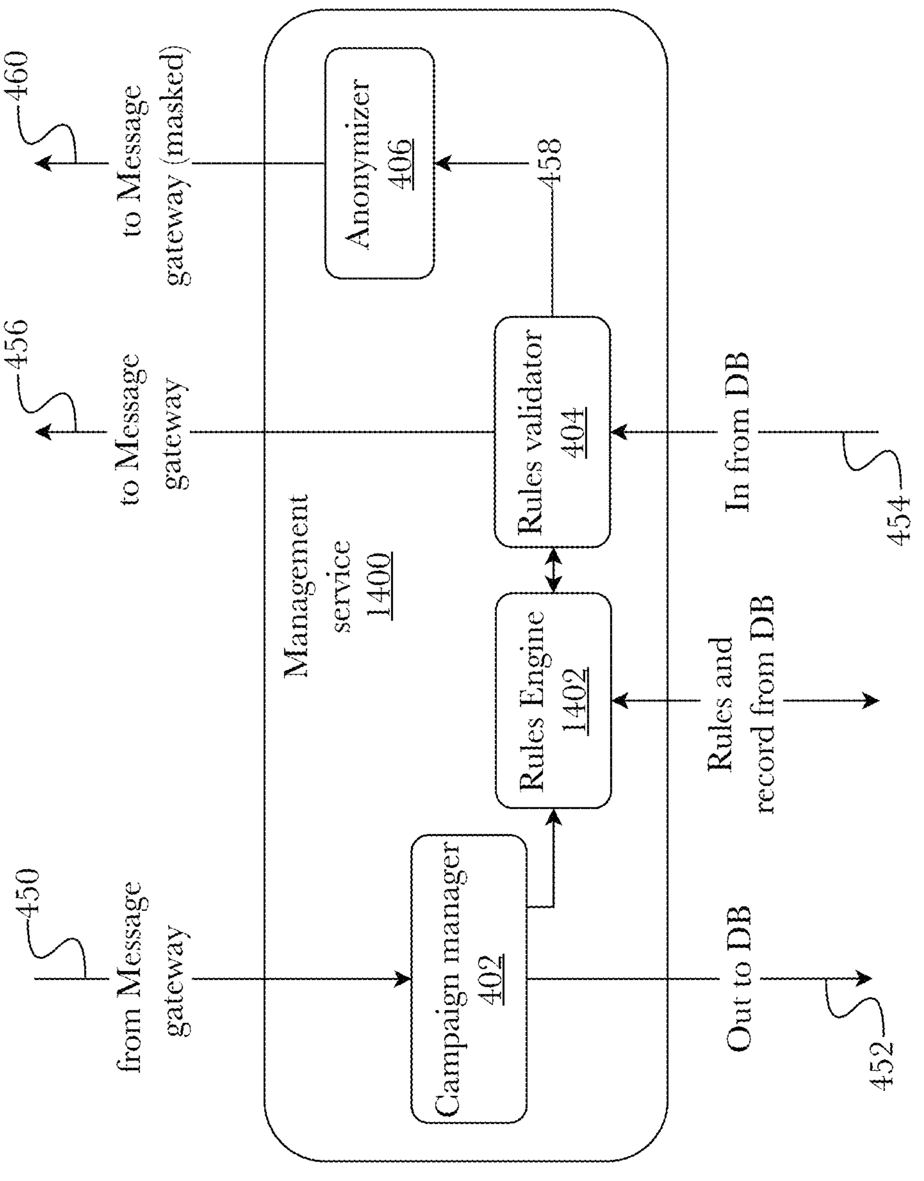
FIG. 14 is a block diagram illustrating an exemplary architecture for a management service configured to identify a subsequent message received from a mobile device and generate different content than that which was sent responsive to an initial interaction between the mobile device and an initiator, according to an embodiment.

FIG. 14 is a block diagram illustrating an exemplary architecture for a management service 1400 configured to identify a subsequent message received from a mobile device and generate different content than that which was sent responsive to an initial interaction between the mobile device and an initiator, according to an embodiment. Management service 1400 functions in much the same way of management service 104 in FIG. 4. However, a rules engine 1401 is present and configured to receive subsequent messages/interactions between a mobile device and platform 100, determine if there is any previous history of interaction with respect to a particular initiator between the mobile device and platform 100, and then generate a different set of content to be transmitted as an auto-populated message to a default messaging application operating on the mobile device.

Messages from the message gateway are received 450 by the management service 1400 and a campaign manager 402 uses the message initiator ID to retrieve the associated content and rules from one or more databases 452/454 and sends the rules to a rules validator 404. If there are no rules and only content to be served, then the content will simply be sent out to the message gateway 456. If a campaign from the one or more databases does contain one or more rules however, the rules validator 404 ensures that all the requirements of the campaign are met before sending the content or executing a specific action is performed. One example is that a rule may dictate that the message be stripped of private information before it is forwarded or used, and in such a case, the message will be sent to an anonymizer 406 before the message is sent 458 to the message gateway 460. The anonymizer 406 removes personally identifiable information (PII) from messages using machine learning algorithms such as natural language processing or natural language reasoning. Rules may go as far as being employed to prescreen the source of the message using the metadata embedded into the message to discriminate whether or not the contents of the campaign may be allowed to be sent to the message sender.

According to the embodiment, campaign manager 402 may receive a subsequent message form the mobile device via message gateway and perform a check to see if there is a record/profile associated with the mobile device and if there is any previous historical interaction data available. If there is no previous interaction data available, then the process continues as described herein. In some embodiments, if there is no active mobile device record, then campaign manager 402 can create an active mobile device record comprising at least any received metadata associated with the mobile device and store the record in database 106. If there is previous interaction data available, then the second message may be forwarded to rules engine 1402. Rules engine 1402 can receive the second/subsequent message and retrieve, receive, or otherwise obtain any metadata which may be associated with an initial, second, or any subsequent message received from the mobile device. Rules engine 1402 may leverage rules validator 404 to ensure compliance with rules prior to generating and sending a second set of content (i.e., a URI which provides a deep link and payload to a messaging application on the mobile device). Rules engine 1402 may utilize various rules and/or policies for generating a second or subsequent set of content to send to the mobile device, wherein the second set of content is different than the first set of content sent responsive to an initial interaction with an initiator. In some embodiments, the second set of content may comprise a custom-generated deep link embedded in an auto-populated text message in the default messaging application on the mobile device.

In various implementations, database 106 may comprise a plurality of engagement rules. Engagement rules may be uploaded as part of the campaign, as discussed herein. Engagement rules may comprise one or more instructions or sets of instructions which, when executed by a processor of a computing device, causes platform 1400 and/or rules engine 1402 to generate a custom payload to be delivered as a second (or subsequent) auto-populated text message. In some embodiments, the engagement rules which determine the generation of the second set of content may be hierarchical rules, wherein some of the rules may take priority or precedence when applied to a subsequent message for the purpose of generating a second set of content. In operation, in an embodiment, rules engine 1402 may evaluate the total set of rules starting with the highest level rules and progresses downward. If a rule at a higher level applies, its conditions or actions are executed. Hierarchical rules allow for the implementation of complex logic by breaking down decision-making into manageable steps. Rules at different levels can interact to create nuance outcomes based on various factors and conditions (e.g., metadata context and user/device record/profile information). Further, hierarchical rule structures can help optimize the evaluation process. Once a rule at a certain level matches the conditions, there may be no need to evaluate rules at lower levels, streamlining the decision-making process.

Figure 18:
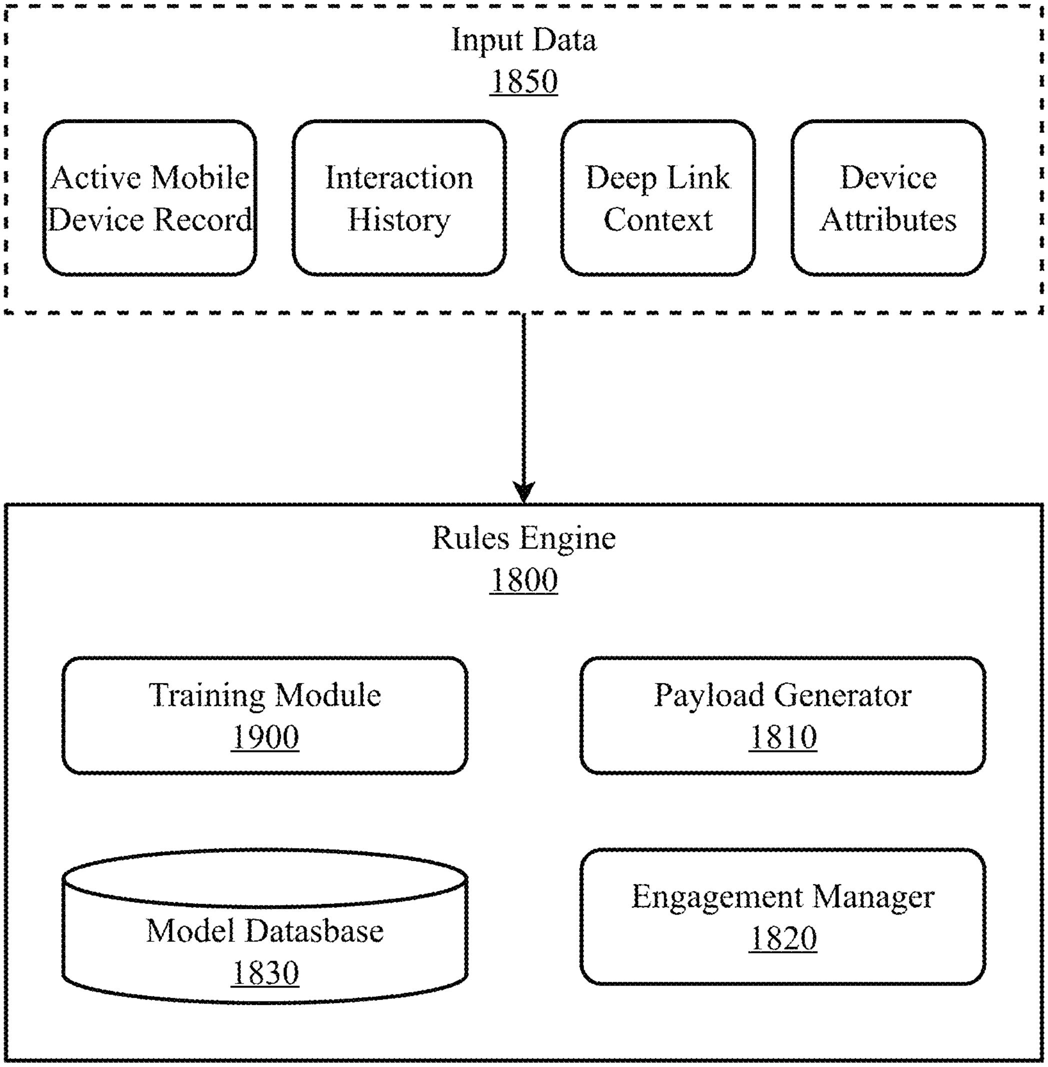
FIG. 18 is a block diagram illustrating an exemplary system architecture for providing link-initiated user engagement and retention utilizing artificial intelligence, according to an embodiment.

FIG. 18 is a block diagram illustrating an exemplary system architecture for providing link-initiated user engagement and retention utilizing artificial intelligence, according to an embodiment. According to the embodiment, a rules engine 1800 is present and configured to operate in a similar fashion to that of rules engine 1402 of FIG. 14. However, rules engine 1800 leverages machine and/or deep learning models to automatically generate pre-filled messages that accompany a deep link, according to some aspects. The system will analyze user and contextual data to produce personalized and relevant messages, enhancing user engagement when sharing deep links within messaging applications on mobile devices.

According to the embodiment, rules engine 1800 comprises training module 1900, a model database 1830, a payload generator 1810, and an engagement manager 1820. Training module 1900 may be configured to build and maintain one or more machine and/or deep learning models using one or more machine and/or deep learning algorithms known to those with skill in the art. Training module 1900 may utilize various input data 1850 such as the non-limiting examples of active mobile device record information, interaction history, deep link context, device attributes, and/or the like. In some implementations, an artificial intelligence (AI) system may be developed to generate a payload for a pre-filled message. In an implementation, the artificial intelligence system is a generative artificial intelligence system. In an aspect of an embodiment, the generative AI system determines the content of an initial payload of a pre-filled message to be displayed in a messaging application on a mobile device responsive to the mobile device interacting with an initiator (e.g., call-to-action such as, for example, a QR code). In another aspect of an embodiment, the generative AI determines both the content of a follow-up message and when to send the follow-up message to the mobile device. For more detailed information about training module 1900 refer to FIG. 19.

Model database 1830 can be configured to store the one or more machine and/or deep learning models developed by training module 1900. Model database 1830 may also store one or more datasets associated with developing the one or more models which may be stored in the database. For example, any training, validation, and/or test datasets used to train a model may be stored and used for various purposes. Storing the datasets ensures that the exact data used during model development is preserved. This is crucial for reproducing and verifying experimental results. The test dataset is used to assess the final performance of the trained model. Storing this dataset allows for unbiased evaluation and comparison of different models or algorithms, helping to identify the best-performing one. During model development, it is common to tune hyperparameters to optimize performance. Having a separate validation dataset facilitates the adjustment of these hyperparameters based on an independent dataset, preventing overfitting to the training data. Storing datasets makes it possible to revisit and refine a model in the future. Training module 1900 can train updated models with the same datasets, allowing for comparisons and improvements over time. For auditing and compliance purposes, regulatory or compliance requirements may necessitate keeping a record of the data used for training and testing machine learning models. Finally, as new data becomes available, the system can retrain or refine the model. Retaining datasets allows training module 1900 to incorporate new information and improve model performance.

A payload generator 1810 is present and configured to use a trained model to determine the content to be assigned to an initiator based on one or more inputs. In some implementations, the one or more inputs can include, but are not limited to, active mobile record data, interaction history, deep link context, and/or device attributes. In various embodiments, the content to be assigned may be a URI, a deep link, a payload, or some combination. In some implementations, the content to be assigned may be referred to as an initial message and may comprise a deep link and a payload, wherein the payload is a pre-populated message suitable for display in a messaging application. In some implementations, payload generator 1810 is configured to generate the pre-filled message using the trained model, wherein the pre-filled message comprises a custom-generated deep link and/or a payload (e.g., personalized, context-aware text-based message). The payload generator 1810 is responsible for generating pre-filled messages when provided with a new deep link context. For example, consider a passive call-to-action associated with an e-commerce application where the passive call-to-action, when interacted with, causes an AI generated pre-populate initial message, comprising a deep link with context and a personalized message, to appear in a messaging application on the mobile device of the user who interacted with the call-to-action. In such an example, the deep link with context might direct the user to a specific product page, highlight a limited-time offer, and pre-fill the shopping cat with the selected item. The deep link context ensures that the user lands on the correct product page with the desired item and offer applied. Payload generator 1910 takes input data, preprocesses it, feeds it into the trained generative model, and produces the pre-filled message output.

The context included in a deep link helps ensure that users are directed to the correct destination and are presented with the most relevant and personalized experience. Deep link context can include, but is not limited to, screen or page identifier, content identification, user state, mobile device state, parameters and attributes, navigation context, and authorization and authentication information (e.g., information related to user authentication and authorization, ensuring the user has the required permissions to access the linked content.) Information about the specific screen or page within the app or website that the user should land on. This could be a unique identifier or a URL. Details about the specific content, product, article, or item the user should see upon clicking the link. Information about the user's current state or status within the app. For example, whether they are logged in, their preferences, or their past interactions. Additional data passed through the deep link, such as query parameters or attributes that customize the user experience. These parameters can carry information like initiator source, campaign ID, or context-specific data. Instructions on how the user interface should behave upon following the link, such as whether to open a modal, display a specific tab, or trigger a specific action. In some implementations, deep link context may be provided as part of an initiator campaign, wherein an administrator or business representative can provide deep link context when uploading other information associated with an initiator (i.e., call-to-action).

An engagement manager 1820 is present and configured to use a trained model to determine both when to send a follow-up message to a mobile device user and the content of the follow-up message. In some embodiments, engagement manager 1820 may leverage an integrated model comprising a time series forecasting model configured to determine the optimal time to send a follow-up message to a mobile device and comprising a natural language processing model to produce the content of the follow-up message. Follow-up messages may be associated with engaging a user, converting a user (e.g., closing a sale), or post-sale engagement (e.g., additional information or promotional offers, a thank you message, a request for a survey, a recommended product/event/service, and/or the like).

Content and/or messages generated by rules engine 1800 may be sent to message gateway 102 where they may be formatted for the appropriate messaging application endpoint (e.g., text message, email message, webchat, voice message, push notification, social media direct message, etc.) and transmitted to a mobile device where they may be pre-populated into the messaging application.

Figure 19:
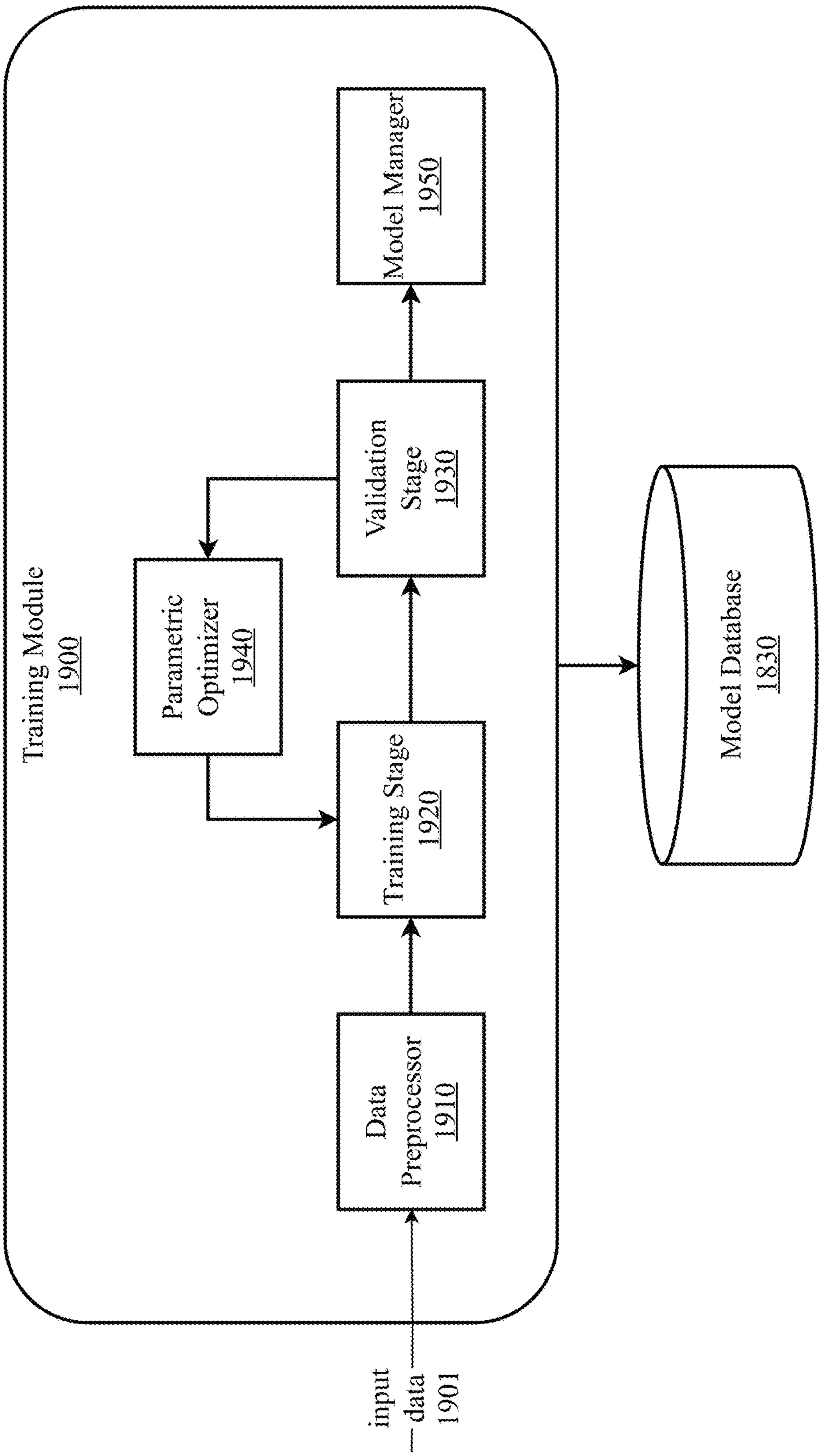
FIG. 19 is a block diagram illustrating an exemplary architecture for a component of a system for link-initiated user engagement and retention utilizing artificial intelligence, a training module.

FIG. 19 is a block diagram illustrating an exemplary architecture for a component of a system for link-initiated user engagement and retention utilizing artificial intelligence, a training module 1900. According to the embodiment, a training module 1900 comprises a data preprocessor 1910, a training stage component 1920, a validation stage component 1930, a parametric optimizer 1940, and a model manager 1950. Model database 1830 is also shown and may be configured to store one or more trained models as well as the various datasets used to create and maintain the one or more trained models. As shown, data preprocessor 1910 may receive a plurality of input data 1901 from various sources. Input data can include (but is not limited to) active mobile device record information, interaction history, deep link context, device attributes, and deep links paired with accompanying messages. Data preprocessor 1910 may receive the input data and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 1910 may also be configured to create a training dataset, a validation dataset, and a test set from the plurality of input data 1901. For example, a training dataset may comprise 85% of the preprocessed input data and the test dataset may comprise the remaining 15% of the data. These datasets may be stored in model database 1830.

According to an embodiment, data preprocessor 1910 may combine the active mobile device record information, interaction history, deep link context data (e.g., URI, metadata, purpose, etc.), and device attributes (e.g., OS, screen size, language, permissions, etc.) into a unified (i.e., structured) dataset. In some embodiments, data preprocessor 1910 may tokenize (e.g., into words or sub-word units) and/or encode (e.g., transform tokens into numerical representations (embeddings)) text data for input into a generative model. Numerical data may be normalized and scaled as necessary.

The preprocessed training dataset may be fed as input into one or more machine and/or deep learning algorithms via the training stage component 1920. The one or more machine and/or deep learning algorithms may be selected from the non-limiting list of neural network, decision tree, support vector machine, decision forest, and/or the like.

According to an embodiment, the one or more machine and/or deep learning algorithms comprises a recurrent neural network (RNN). According to an aspect of an embodiment, the RNN is a long short-term memory (LSTM) based RNN configured as a generative model to generate the content of pre-filled messages to be applied to an initiator. The architecture for the RNN may be set up as a multi-layered LSTM network for sequence-to-sequence prediction. In some embodiments, the teacher forcing technique may be applied wherein during training, the true previous token is input as the next token's input. During training, training stage 1920 may gradually transition from teacher forcing to using model-generated tokens via scheduled sampling. In an embodiment, the model may be enhanced with an attention mechanism to capture relevant context and focus on relevant parts of the input data. Frameworks such as TensorFlow, PyTorch, or Keras can be used for model development.

An LSTM RNN architecture with an attention layer may be used in various implementations of the disclosed system and methods. The LSTM RNN will have an input layer that takes the input data, which in the case of text-based tasks might be a sequence of words or tokens. Each token is usually represented as a vector (i.e., embedding). The long short-term memory layers process the sequential input and capture temporal dependencies. LSTMs are designed to maintain and update memory over long sequences, making them well-suited for tasks involving sequences like natural language processing. The attention layer computes the weights for different parts of the input sequence, highlighting the relevant portions. The attention mechanism helps the model focus on different parts of the input when making predictions at each step. It enhances the model's ability to capture context and improves model performance, especially for long sequences (e.g., for the content of an initial message or follow-up message). The attention mechanism produces context vectors, which are weighted sums of the input sequence. These context vectors provide a summary of the most important information in the input sequence for each step of the output sequence. In some implementations, a decoder LSTM processes the context vectors along with previous generated tokens to predict the next token in the sequence. The final layer (e.g., output layer) produces the model's prediction or output based on the processed input sequence and the generated context vectors.

According to an embodiment, training module 1920 may be configured to train another, separate AI system to predict both when to send a follow-up message and the content of that message. Training such a system involves a combination of techniques from time series forecasting and natural language processing (NLP). The data collected and used to train such a model can include, but is not limited to: any available historical data on user interactions, including timestamps of sent messages, user response, and engagement patterns; user attributes, preferences, and context; stored engagement rules and associated engagement instructions; and deep link and corresponding message information. In some implementations, the data may be organized into a structured format with appropriate features for prediction, including timestamps, active mobile device records, and message content. Feature extraction may occur wherein features are created that capture the time-related patterns (e.g., time of day, time of week), user behavior (e.g., previous interactions), and context (e.g., current user status or location). In some implementations, word embeddings or other NLP techniques may be used to represent message content in a numerical format suitable for model input. A time series forecasting model such as, for example, LSTM or autoregressive integrated moving average (ARIMA), may be used to predict the optimal timing for sending a follow-up message. The time series model should take into account historical engagement patterns and user behavior. In some embodiments, an NLP model (e.g., LSTM, transformer, etc.) is used to predict the content of the follow-up message. This model can consider the active mobile device record, historical interactions, engagement rules and associated engagement instructions, preferences, and the context of the session/conversation.

Training stage 1920 can train the time series forecasting model to predict the optimal time delay between the pre-filled message and the follow-up message. Likewise, training stage 1920 can train the NLP model to generate the content of the follow-up message based on user attributes, stored engagement rules and associated engagement instructions, context, and previous interactions. According to an embodiment, the system can integrate the the two models into a unified framework that takes user attributes, context, and the pre-filled message as input. Validate the combined model's performance using the validation set and adjust hyperparameters as needed. Training module 1920 can use metrics such as engagement rate, response rate, and user satisfaction to evaluate the effectiveness of the follow-up strategy. Training module 1920 will continuously monitor the model's performance and collect feedback from user interactions.

At the validation stage 1930, training output is produced and used to measure the accuracy and usefulness of the model outputs. To prevent overfitting (where the model learns noise in the training data instead of general patterns), validation stage 1930 may monitor the validation loss during training. If the validation loss stops improving or starts to increase, validation stage 1930 can stop the training early to avoid overfitting. During this process a parametric optimizer 1940 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation units in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training module 1900 provides a machine learning training loop.

A model manager 1950 is present and configured to deploy and maintain trained models. According to an embodiment, model manager 1950 can test validated models using a test dataset. Once training is complete, the test dataset is used to evaluate the model's performance on unseen data. This provides an unbiased estimate of the model's generalization ability. If a model produces satisfactory output based on the test dataset, then the model may be deployed into a production environment wherein it can generate content, make predictions, or execute other autonomous tasks depending upon the use case. Model manager 1950 may be further configured to monitor deployed models to gather information about model performance and to periodically tune or retrain deployed models using new or updated versions of existing datasets. Model manager 1950 may interface with model database to store and/or retrieve trained models as required during system operation.

Figure 22:
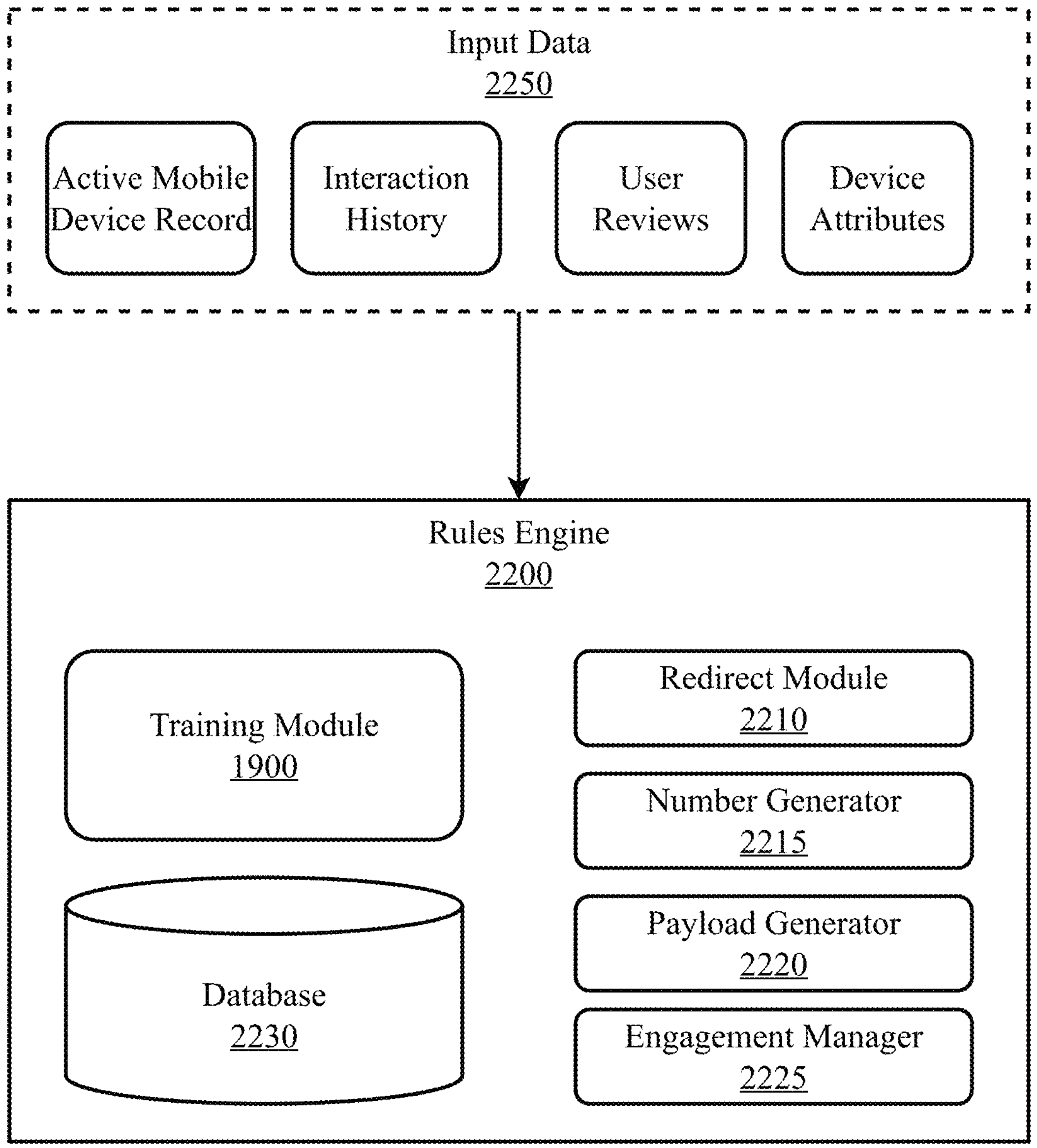
FIG. 22 is a block diagram illustrating an exemplary architecture of a component of a system for providing link-initiated secure voting and review, a rules engine.

FIG. 22 is a block diagram illustrating an exemplary aspect of a system for providing link-initiated secure voting, a rules engine 2200. In various implementations, rules engine 2200 may be implemented on platform similar that of platform 1400, for example. In some embodiments, rules engine 2200 may share similar functionality and capabilities as rules engine 1900, however, according to the embodiment, rules engine 2200 is further configured to facilitate secure voting and review (as well as other forms of verified (or not) feedback or communication). The system is designed to be highly scalable to handle large volumes of user reviews in real-time, utilizing cloud-based resources which can be dynamically created to satisfy the required resource demand.

An organization or enterprise (or individual) can create, and upload campaign details associated with an event, product, service, person, etc., wherein the campaign details comprise information about specific topics which may be up for a vote, review, feedback, endorsement, or some other form of interaction with the general public or specific (e.g., targeted) group of users. For example, if a campaign was created to facilitate voting in a local city council election, the campaign details may comprise information such as the candidates for the position, each candidate's party affiliation, and other data that may be relevant for conducting such an election. When a user interacts with an initiator linked to the city council election campaign, that interaction is captured by platform 1400 and a redirect is generated which causes a pre-populated message to appear in the messaging application on the user's mobile device. The prepopulated message may comprise a deep link which causes the pre-populated message to appear and a message payload. The payload may comprise relevant information associated with the vote. For example, the pre-populated message may indicate a selection of a candidate, for instance, "I select Sally Jenkins as Mayor of Busy Town, USA." The redirect would occur when the mobile device user sends the pre-populated message, thereby casting his or her vote, to continue the example; the pre-populated message also comprise an destination (for example, a phone number) which can cause the message to be redirected to a specific website, platform, or service associated with the vote/review/feedback/etc. In some embodiments, the payload may comprise another deep link which itself is a redirect which redirects the user to a specific website, platform, or service to cast their votes in an election or poll. In some embodiments, the contents of the payload may be determined by one or more campaign rules. In some embodiments, the contents of the payload may be determined using AI (e.g., via payload generator 2220 and/or engagement manager 2225).

According to an embodiment, the payload may comprise a unique toll-free generated for a particular mobile device based on the mobile device interacting with an initiator such as an initiator associated with a user review or vote. In this embodiment, rules engine 2200 comprises a number generator 2215 configured to generate a unique toll-free number for mobile device users to vote or leave a review based on, at least in part, various types of mobile device metadata, campaign data, and/or any available information about the mobile device and/or its user (e.g., such as by accessing an active mobile device record associated with the mobile device, if applicable). For example, a fundraiser broadcast on national television may display a QR code (i.e., an initiator) on the television screen, that when scanned/interacted by a mobile device of a television viewer, causes a deep link to be generated which causes the phone application to enter the pre-populated unique toll-free number ready to send.

Number generator 2215 can be configured to collect and process relevant metadata about the mobile device user, including location, device type, time of interaction, and other relevant metadata. Number generator 2215 may be configured to generate toll-free numbers via a defined format. The defined format could incorporate the collected metadata. For example, number generator 2215 could create or follow a format that includes elements like the use's location code, device type code, and a unique identifier. In such embodiments, number generator 2215 can generate a unique identifier based on the metadata; this can involve creating a hash or using a combination of data fields to ensure uniqueness. The unique ID may be combined with the defined format to generate a toll-free number. Number generator 2215 may perform a check to ensure that the generated number adheres to toll-free number conventions and is valid for use. The platform (e.g., platform 1400) may integrate with a telecommunications service provider or platform that can provision toll-free numbers. This may involve using an API to request the creation of a new toll-free number. Number generator 2215 can submit a request to the telecommunications provider to provision and assign the generated toll-free number to the mobile device user. The provider's system will validate the availability of the number and allocate it to the user. The system can notify the mobile device user about the assigned toll-free number. It can send this notification via pre-populated message to a messaging application on the mobile device (e.g., through SMS, email, or an in-app message), providing instructions on how to use the number for voting or leaving a review.

In some implementations, when a user dials the toll-free number, they can be greeted with an Interactive Voice Response (IVR) system that guides them through the voting or review process. The IVR system can use voice prompts to collect the user's input.

According to some embodiments, campaign details can further comprise a set of voting rules which dictate how votes/reviews should be handled by platform. For instance, there may be rules which govern how votes are to be tallied or how to handle situations where a user tries to vote more than once or leave multiple reviews for a product/service/event/etc. For example, in the case of All-Star voting for a sports league, there may be rules in place which indicate a person can vote multiple times, but only one per day until the cut-off day for counting votes. Whereas a political election would have rules which indicate that a person is only allowed to cast one vote. The rules may be as complex or simple as deemed necessary by the organization or enterprise which creates and uploads the campaign. For instance, there may be a rule in place which allows for multiple votes to be received from the same person, but the rule states that the most recent vote replaces the old vote, or that subsequent votes are discounted (such as in the case of an All-Star vote). In some embodiments, rules may be in place which indicate that multiple votes by an individual are aggregated into a final vote. Rules may be stored in database 2230 and retrieved by various component of rules engine 2200.

An event, product, or service which may be put up for a vote or subject to a user review may be associated with an initiator. The initiator may be interacted with by a user mobile device such as scanning a QR code. For example, a restaurant may create a campaign to have its patron decide what the new menu item should be by having a QR code on the menu next to each new menu item. A patron could scan the QR code to cast a vote, wherein scanning the QR code causes the system to create a deep link to the patron's messaging application with a message ready to send such as "This is the menu item I think should be added to the menu permanently." Metadata about the mobile device may be transmitted to platform during the initial scan and/or when the pre-populated message is sent. In some embodiments, the user of the mobile device may be validated or otherwise authenticated prior to a vote or review being cast/received by using the metadata (e.g., mobile device identification information) and one or more verification rules stored in validation database(s) 1202. In this way, platform can enforce voting compliance and user security. Privacy concerns are address through data anonymization and compliance with relevant data protection regulations (e.g., GDPR). User data is securely stored and transmitted using encryption protocols. In some embodiments, the user verification happens when the initial message is received using the metadata received with the initial message and/or one or more verification rules (as stored in validation database(s) 1202). Once verified, the user may be redirected to the appropriate voting portal.

According to an aspect of an embodiment, the system may leverage a trained machine and/or deep learning algorithm configured to interpret user review text and analyze the sentiment and positivity/negativity (referred to herein as positivity, for simplicity) associated with a received vote, survey, feedback, etc. in order to provide system users with insights into customer perceptions and emotional responses, enabling system users to make informed decisions for product improvement and customer engagement. In some embodiments, the AI system may integrate with an exposed API endpoint to enable integration with other applications and platforms. API requests can include user review text, and the API responds with the sentiment and positivity analysis results. In some embodiments, the results of the sentiment and/or positivity analysis may be used as inputs to payload generator 2220 and/or engagement manager 2225 in order to generate an initial or follow-up message to be sent to a mobile device.

User sentiment refers to the overall emotional tone or attitude conveyed in a user review or other user submitted text-based object (e.g., a vote, endorsement, etc.). It encompasses both positive and negative feelings. A user sentiment analysis aims to determine whether the sentiment expressed in a review is generally positive, negative, or neutral. It provides an understanding of the user's overall opinion and emotional response to a product, service, or experience. User positivity specifically focuses on the positive aspects or favorable opinions expressed in a user review. It involves identifying and analyzing the positive sentiments, comments, or feedback provided by users. User positivity analysis aims to highlight the strengths, advantages, and favorable features mentioned in the reviews. User negativity is the opposite of user positivity. It refers to the negative aspects, criticisms, complaints, or unfavorable opinions expressed by users in their reviews. When analyzing user reviews, a user negativity analysis focuses on identifying and understanding the negative sentiments, comments, or feedback provided by users. Both user positivity and user negativity analyses provide insights into customer perceptions and can guide businesses in making informed decisions to enhance their offerings and customer relationships. Sentiment and positivity with respect to a review, endorsement, vote, etc. are not the same thing, although they are closely related. Sentiment is how the user feels; a review is what the user thinks of the thing they are reviewing. The user could feel negatively (at the time of leaving the review), but nevertheless want to leave a review with positive comments about the target (e.g., product).

Training module 1900 is used to train the AI system to analyze the sentiment and positivity associated with user submitted text such as, for example, a review text, endorsement, or vote cast for a product, person, service, etc. In an embodiment, raw user review text is collected from various sources (e.g., websites, social media, etc.) and preprocessed to remove noise, punctuation, and special characters. The dataset may be an annotated dataset of user review text with sentiment labels and positivity/negativity labels. Text is tokenized and transformed into a structured format for analysis. In an aspect, training module 1900 utilizes advanced NLP techniques to convert tokenized text into dense numerical vectors. Techniques like Word2Vec, GloVe, or transformer-based embeddings (e.g., BERT) can be employed. According to some implementations, a deep learning model, such as a recurrent neural network or a transformer-based architecture, is trained to predict sentiment labels (positive, negative, neutral) based on the text embeddings. This model learns the contextual nuances of language and its impact on sentiment. The models are trained using appropriate loss functions (e.g., cross-entropy) and optimization techniques (e.g., Adam optimizer). Training is performed on a dataset split into training, validation, and test sets. Model performance is evaluated using metrics such as accuracy, precision, recall, F1-score, and confusion matrices on the validation and test sets. Various types of inputs 2250 may be used by the various models described herein.

A separate positivity/negativity model may also be developed using training module 1900. This model identifies and classifies positive and negative sentiments separately. It can employ similar techniques as the sentiment analysis model but focuses on binary classification or positivity and negativity.

Model predictions may be post-processed to generate sentiment scores (e.g., sentiment intensity scores ranging from −1 to 1) and separate scores for positivity and negativity. These predictions/scores may be aggregated, and a campaign score can be generated which describes the overall user sentiment and positivity associated with a specific campaign. For example, a campaign to determine how much early access viewers enjoyed (or didn't enjoy) a new movie wherein the viewers can scan an initiator (e.g., a QR code) outside the theatre after they have watched the movie, the scan causing the server to redirect the user, in the form of a pre-populated text message comprising a deep link being displayed in the messaging application of the mobile device of the viewer, can determine the overall sentiment of all the viewers.

According to some aspects, the metadata associated with a review or vote may be analyzed to determine the "quality" of the review. For example, if a campaign is created to collect user feedback on the location of a new cross-walk, then user feedback/votes associated with users who don't live in the town or local area may not be useful or quality information. Location metadata associated with the vote or review may be analyzed to determine if person who submitted the information is relevant to the campaign. In some embodiments, the quality of a vote or review may be analyzed using machine and/or deep learning models. In some embodiments, the quality of a review may be determined and assigned a score (e.g., 1 to 5 rating). In some embodiments, the quality score may be used as an input to payload generator 2220 and/or engagement manager 2225 in order to generate an initial or follow-up message to be sent to a mobile device.

Some exemplary criteria which may be used to define a high-quality review based on a specific context can include factors like review length, language complexity, sentiment, relevance, positivity, and engagement, to name a few. A model may be trained to determine review quality. Such a model may be trained using a dataset comprising at least user reviews along with associated metadata, which may include information like user demographics, timestamp, location, device type, etc. The dataset may be preprocessed and the text tokenized. The next step is to perform feature extraction on the preprocessed dataset. Text-based features ca include, word count, average word length, sentiment score, readability scores, (e.g., Flesch-Kincaid), and frequency of specific keywords. Metadata-based features can include, timestamp, location, device type, user engagement (e.g., click through times, time spent on review, etc.), and user reputation (if available). In some implementations, a subset of data may be labeled as "high quality", or "low quality" based on the predefined quality criteria. This labeled dataset will be used as the training dataset. Next, train a machine learning model to predict review quality based on the extracted features. Training module 1900 can use various algorithms like logistic regression, random forest, or neural networks. The model should take both text-based features and metadata-based features as inputs. During model training analyze the model to understand which features contribute most to determining review quality. This insight can help to understand what aspects of metadata have the greatest impact on quality assessment. Once the model is trained and evaluated it can automatically assess the quality of new reviews as they come in. Redirect module 2210 may calculate the predicted quality score for each review based on the model's output. In some implementations, a threshold is set on the predicted quality scores to classify reviews as "high quality" or "low quality." This threshold should be determined based on a balance between precision and recall or other relevant criteria.

DETAILED DESCRIPTION OF EXEMPLARY ASPECTS

Figure 6:
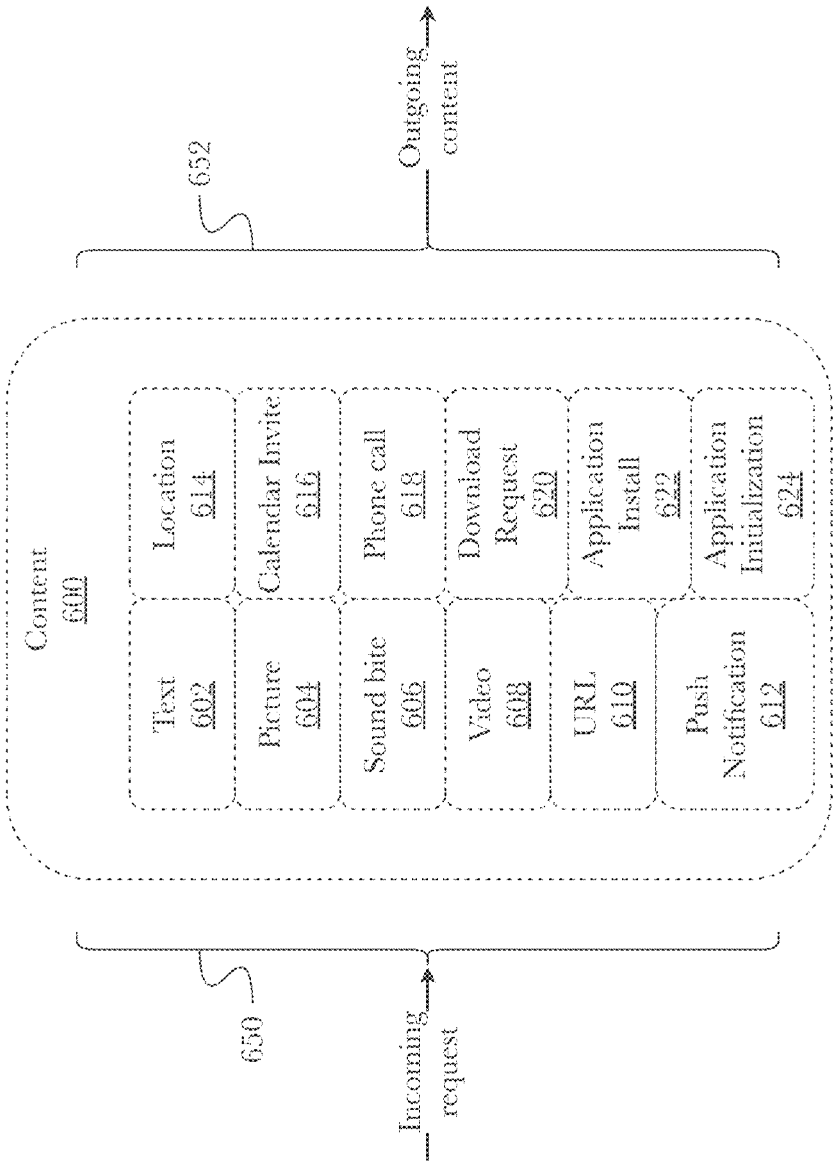
FIG. 6 is a block diagram illustrating exemplary content that may be served by a dynamic-link communication platform.

FIG. 6 is a block diagram illustrating exemplary content 600 that may be served 650/652 by a dynamic-link communication platform. Content that may be stored and served via a dynamic-link communication platform may comprise text 602, pictures 604, sound bites 606, videos 608, URLs 610, push notifications 612, location data 614, calendar invites 616, phone calls 618, download requests 620, application install request 622, and application initializations 624. Much of this content may be sent over MMS or other messaging services, attached to emails, or hosted in the cloud that may be linked in emails and texts, or hosted elsewhere and sent via URL's, among many other possible combinations known in the art. Another type of content that may be stored and served via dynamic-link communication platform may comprise custom-generated deep links.

Figure 7:
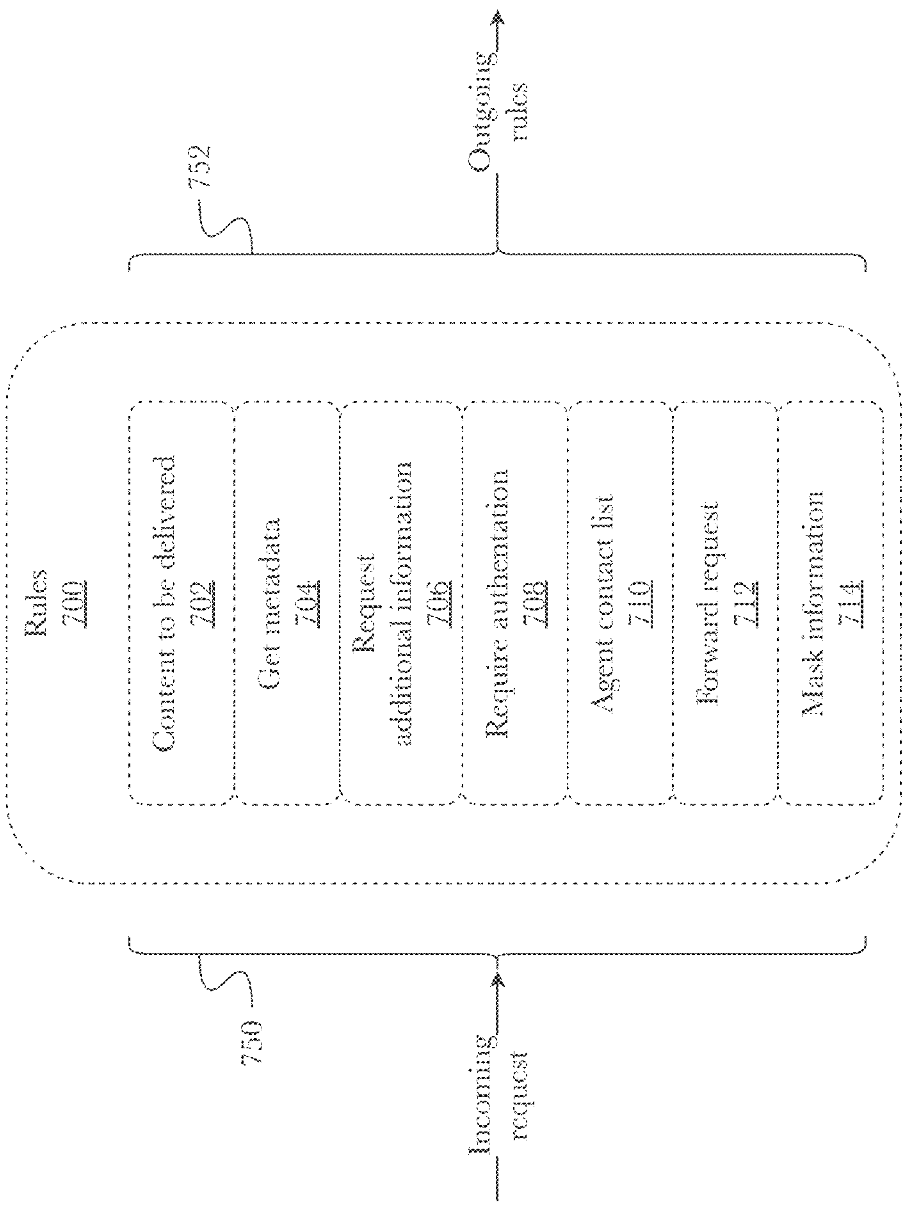
FIG. 7 is a block diagram illustrating exemplary rules that may be used by a dynamic-link communication platform.

FIG. 7 is a block diagram illustrating exemplary rules 700 that may be used by a dynamic-link communication platform. A non-exhaustive list of exemplary rules 752 that may be used against an incoming request 750 comprises: what content may be delivered 702, what kind of metadata to retrieve from the device 704, whether or not to send subsequent messages to the device requesting additional information 706, and whether or not the content requires authentication 708. Rules may be an algorithm comprising a list of agents such that the algorithms perform a round-robin style query to find an available agent, and other like algorithms 710. Rules may simply forward messages to a system, device, or agent 712. Other rules may require that certain information be masked for privacy and regulatory compliance 714.

Figure 8:
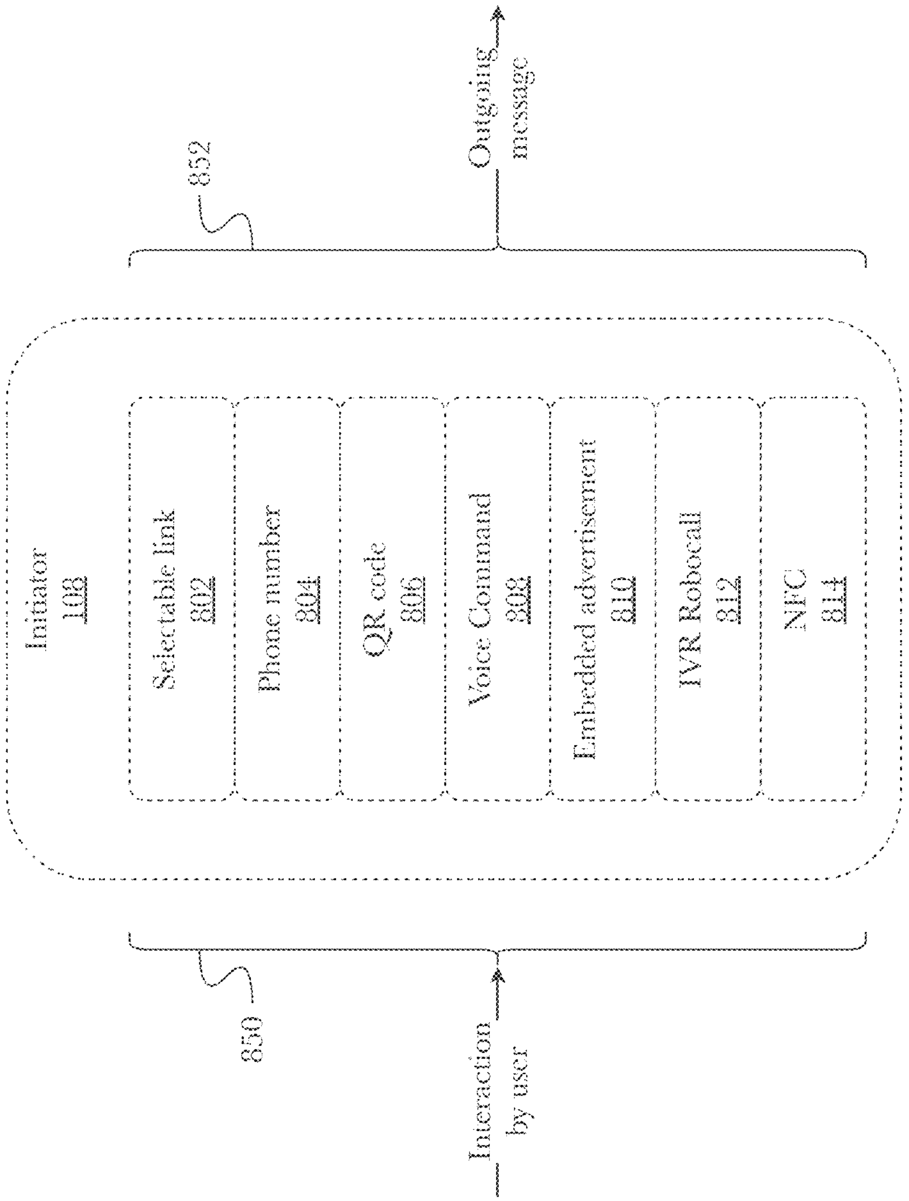
FIG. 8 is a block diagram illustrating exemplary initiators used to facilitate dynamic-link communications.

FIG. 8 is a block diagram illustrating exemplary initiators 108 used to facilitate dynamic-link communications. As illustrated by the diagram and the many initiator forms 802-814, it can be seen that an initiator 108 may take the form of anything that allows the user to interact 850 with the initiator 108 such that a device used to engage with the initiator can be commanded to auto-populate a message on the device 852. Tappable content on a mobile device or clickable links from a desktop for laptop computer may be used 802. Phone numbers on a printed advertisement can be dialed by the user in which an automated system on the other end of the line automatically responds with a text message to the calling device 804. QR codes are suited very well for this purpose as they may embed a plurality of information pertinent to efficient two-way communications 806. Another example may be a voice command that may be displayed to a user such that the user may say the voice command to a virtual assistant 808 on his or her device to initiate the communication. According to another embodiment, a purpose-built application for a dynamic-link communication platform may comprise its own virtual assistant and may also add increased functionality to a dynamic-link communication platform system. Advertisements embedded within applications and software programs 810, interactive voice response robocalls 812, and near field communication technologies 814 are all other examples that may be used as initiators 108. Other types of initiators that may be used to facilitate dynamic-link communications can further include clicking a push notification, making a purchase within an application or software, performing a search, or a referral from a social media network.

Figure 9:
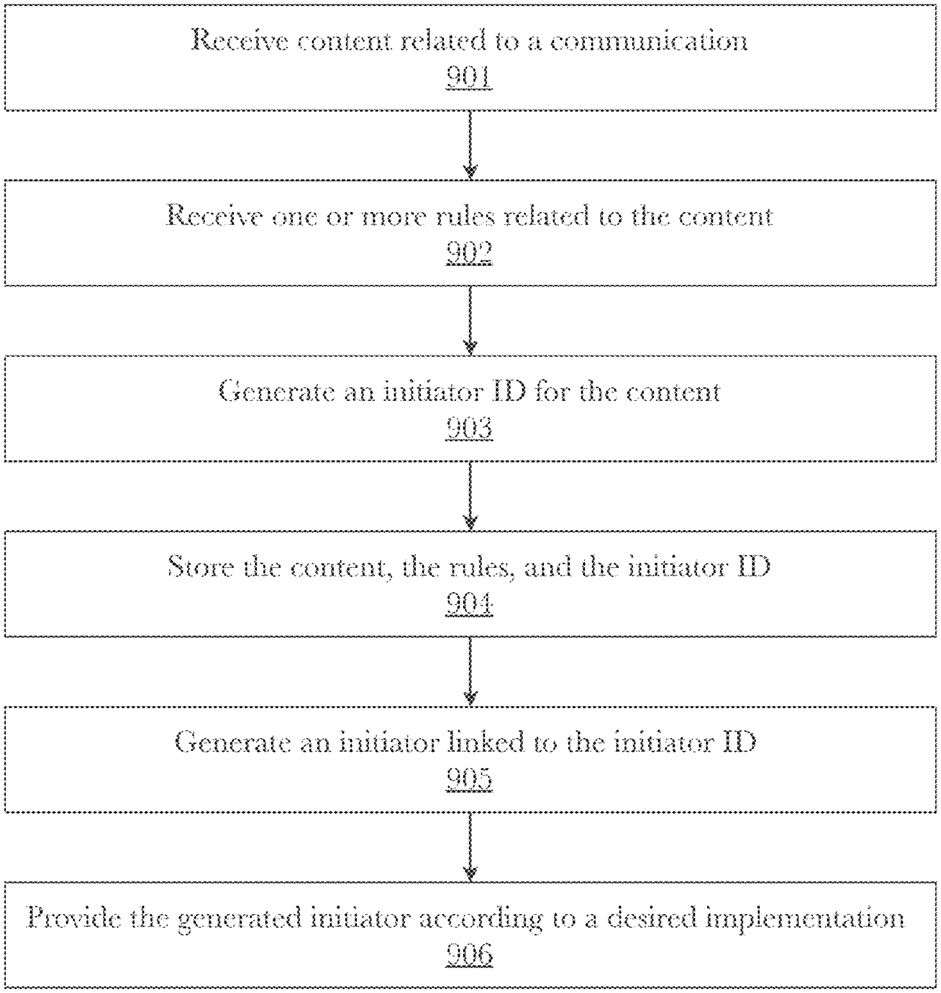
FIG. 9 is a flow diagram illustrating an exemplary method for initializing a dynamic-link communication platform.

FIG. 9 is a flow diagram illustrating an exemplary method for initializing a dynamic-link communication platform. Regarding the steps in this diagram, there is no strict requirement for the steps to be in this particular order. For example, content and rules may be received at the same time and stored before the initiator ID is generated. It will be appreciated by those skilled in the art that the general process is to populate a database with the content to be served, the rules related to how that content is served and to whom, and then to generate and link an initiator and initiator ID such that it may actually be served.

In a first and second step 901/902 content and one or more rules related to the content are received. In a third step 903, an initiator ID is generated or retrieved for the campaign, where the campaign is all of the data associated with that particular product or service. Initiator IDs may be issued sequentially or according to an algorithm, and the initiator ID's may also be used to identify campaigns, if so desired. In a fourth step 904, the content, rules, and initiator ID are stored in a database as a campaign. In a fifth step 905, an initiator is generated according to the provisions of the campaign. It is also anticipated that an initiator does not necessarily have to be generated, but may also be received along with the content and rules. It should be understood that whether an initiator is generated or received, it is inherently linked with the initiator ID of the associated campaign. In a sixth step 906, the initiator is deployed according to the stipulations of the campaign. It is anticipated that there may be many initiators taking various forms of which all link to one initiator ID.

Figure 10:
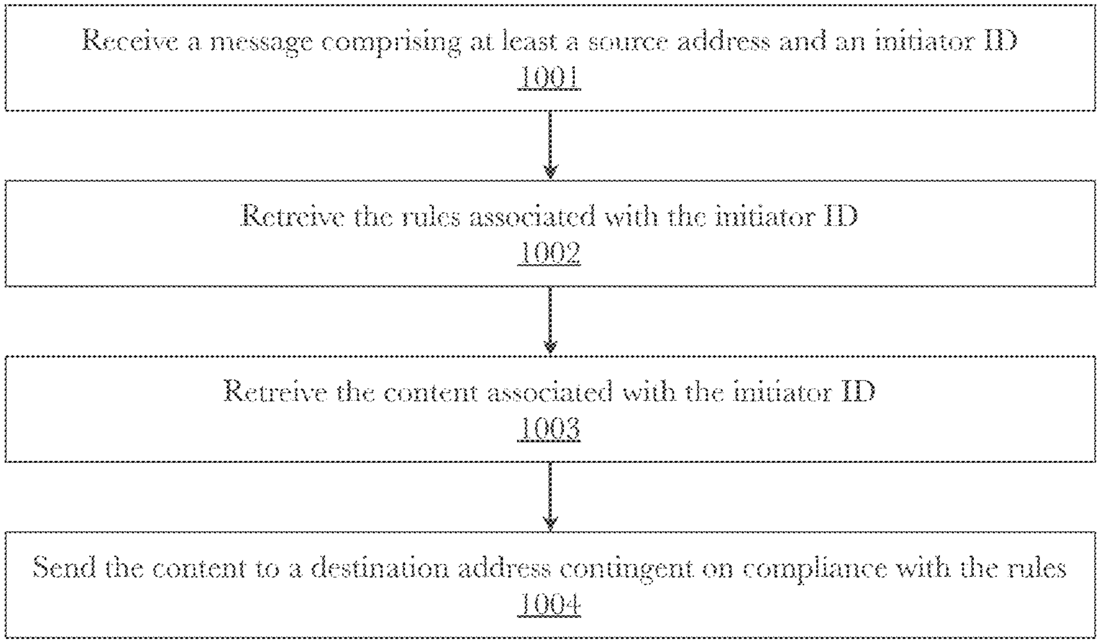
FIG. 10 is a flow diagram illustrating an exemplary method for implementing a dynamic-link communication platform.

FIG. 10 is a flow diagram illustrating an exemplary method for implementing a dynamic-link communication platform. In a first step 1001, a message is received comprising at least the originating source address and an initiator ID. In a second step 1002, rules associated with the initial ID are retrieved. In a third step 1003, content associated with the initiator ID is retrieved. In a fourth step 1004, the content is sent, or the action triggered by the rules is executed, only upon compliance with the rules associated with that campaign.

Figure 11:
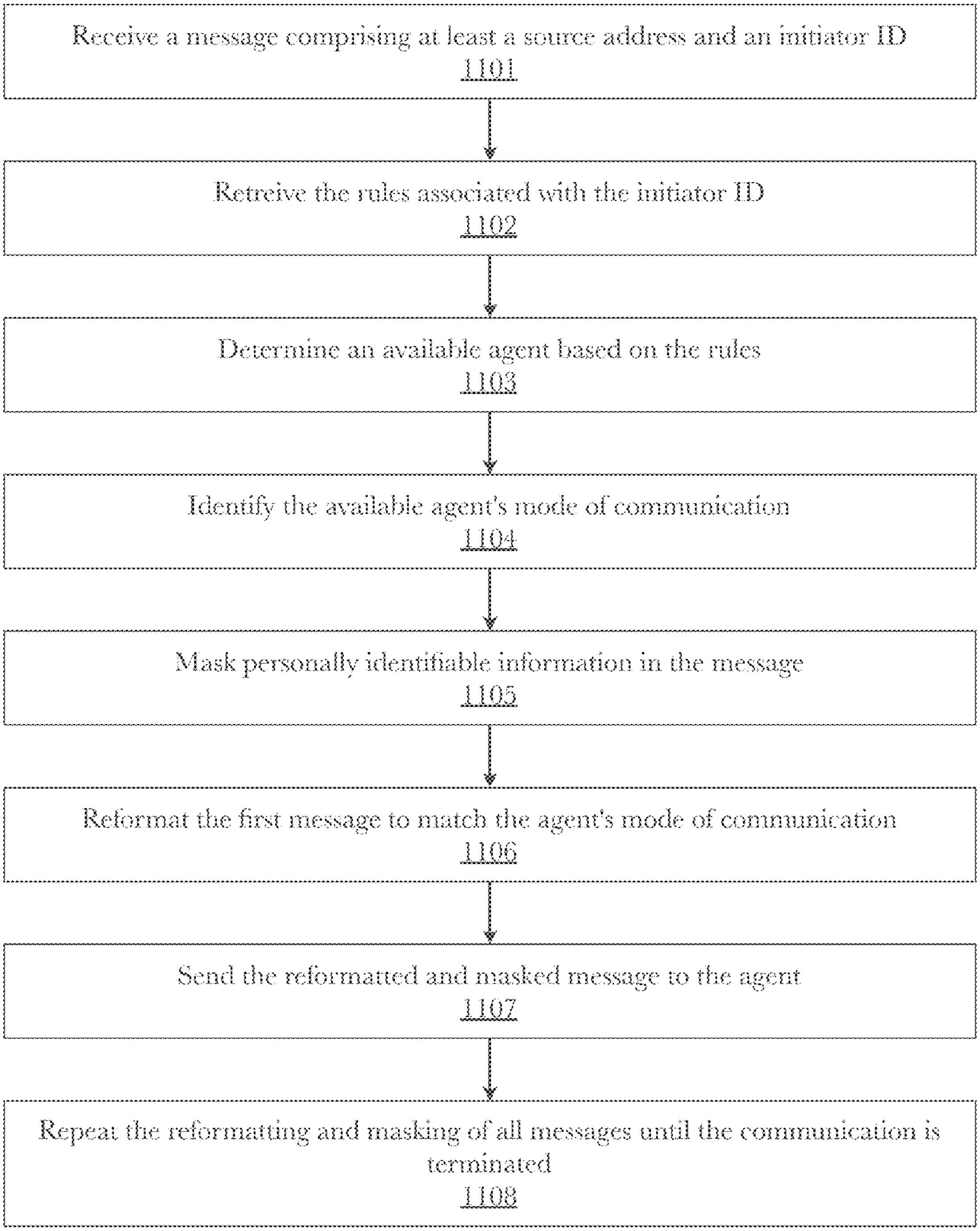
FIG. 11 is a flow diagram illustrating an exemplary method for facilitating multimodal communications.

FIG. 11 is a flow diagram illustrating an exemplary method for facilitating multimodal communications. In a first step 1101, a message comprising at least an originating source address and an initiator ID is received. In this case, the campaign—via the initiator—generating the message is intended to initiate a communication between the user and an agent. More particularly, initiate and facilitate a privacy-compliant communication between a user's device and an agent's device. In a second step 1102, the initiator ID is used to retrieve the rules for the campaign. In a third step 1103, the rules are used to determine which agent contact and when. In a fourth step 1104, the selected agent's mode of communication is identified. Additionally, in this scenario, the mode of communication of the user and the mode of communication of the agent or not the same. In a fifth step 1105, personally identifiable information is masked or removed in the message received in step 1101. In a sixth step 1106, the message received in step one 1101 is reformatted to match the agent's mode of communication. In a seventh step 1107, the masked and reformatted message is sent to the agent. In an eighth step 1108, all subsequent messages of the communication between the user's device and the agent's device are formatted and masked appropriately until the communication is terminated.

Figure 13:
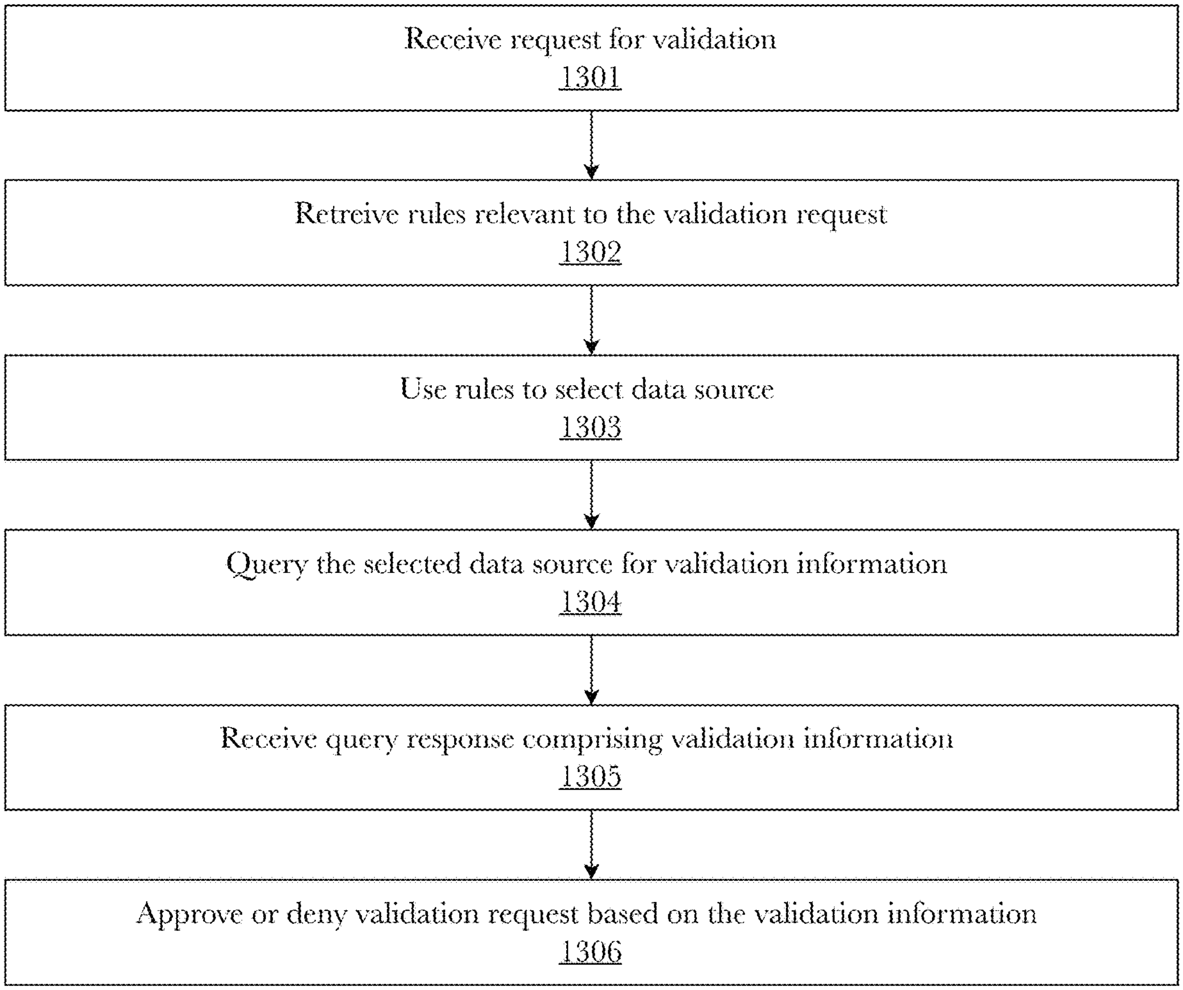
FIG. 13 is a flow diagram illustrating a method for verifying a user via a mobile device and reverse lookup.

FIG. 13 is a flow diagram illustrating a method for verifying a user via a mobile device and reverse lookup. As described in various previous figures, the general invention is a system and method for initiating some form of communication between at least two entities. This communication is initialized by providing a user with a mobile device some means by which they may initiate a communication related to some product or service the person is interested in. Such means may comprise a billboard with a phone number or a URL, or an advertisement on a bus stop with a QR code, or may comprise an online advertisement that is selected or clicked by the user, among many other options and combinations. When the user interacts with the advertisement (e.g., goes to the URL, clicks on the advertisement, scans a QR code, etc.) a text message is auto populated on the user's device. As fully described in the previous figures, but generally re-described here, is that the means to produce both the content of the text message and the text message itself may happen in various ways. The content of the text message may be retrieved from the URL, or may be embedded within the QR code, or originate from the advertisement that was selected. As with the exemplary means in the previous statement, each means may also have a way to embed other contextual information for the purposes of communication satisfaction. This "other context" may include the time the interaction was initiated, locality data, identifying information from the mobile device or user, campaign matching information, and other data and metadata useful for such interactions. Once the text message and all of its content is populated on the user's device the user may just simply hit the send button. That text message is now received by a service that facilitates a privacy compliant communication relevant to the advertisement/product/service. One example is when a user selects an online advertisement, say to buy specific car, information from the user's device and information contained by or retrieved by the advertisement campaign is used to auto populate a message which is then sent by the user. That text message and the relevant information is used by service to find and connect the user with an agent at the dealership and even further mask any private information on both ends of the communication, i.e., remove all personally identifiable information such as phone numbers and names.

FIG. 13 comprises a method of adding a validation service to the system and method described above. Where a user will still interact with some form of media, advertisement, or content, but where the interaction further requires that the user be validated. Many levels of verification are anticipated. One verification method comprises using the phone number of the mobile device which initiated the communication to perform a reverse lookup and compare the person associated with the phone number (or billing information) with the person attempting to initiate the interaction. This verification method can be supplemented with any level of authentication so desired. This may mean a username and password, biometrics, some third party authentication service, and other types of authentication services in use. If the user has been successfully verified, then an approval to complete the transaction, allow entry, or some other action may occur. Using the example of the car advertisement, a user may be pre-verified or preauthorized for the vehicle purchase just by authenticating themselves when they click on the advertisement. This can apply generally to any ecommerce platform. Furthermore, the validation service may comprise a federated data store or a distributed ledger, private or public, or other forms of robust data services needed to facilitate authentication transactions. Databases and data store services may be local or distributed or some combination thereof. For example, a local database may be populated from a federated data store as users are validated, removing the need to query the federated data store if a user already exists as validated in the local database. The validation service may also comprise a set of rules, also the rules may be local or retrieved from some rules database, and the rules tell the service how to validate, at what level to validate, and at what level each person is validated—if there is more than one level of validation. One example of this, is where a person requesting access into a public venue is provided access to certain areas only if they have received one or more vaccines. In such a case it may be that the person is not verified of receiving the vaccine if any of the databases within the federated data store reflect as much, but the person has received a valid vaccination card that can be verified manually by someone at the gate/entry. Such a case may happen if the person has just received a vaccine and that information has not been entered into any of the databases. And if that is the case, then it is possible to flag the user as validated and allow them access to the venue but perhaps not into specific areas or that the person is only allowed access for a specific period of time and must always be reverified until the federated or local data store reflects the manual verification of the vaccine card. The local database may use many types of technologies, one anticipated method is to use a private blockchain to better protect against privacy and HIPAA violations.

In a first step 1301, a request for validation is received by a validation service. This request may comprise information pertaining to the person or device for which the validation is requested. The request may also comprise information relating to the type of validation or reason for the validation which may be used to determine which rules are relevant to completing the validation request 1302. There may be many rules contained within a rules database or within the validation service. For example, the validation service may be used to perform validations of vaccinations, e-commerce transactions, sales leads, etc. In other words, a request for validating a person or device is received which comprises information which allows the validation service to know how to validate and where to validate from for the request. With the proper rules selected, the validation service now selects the appropriate data sources 1303 from which to query for the purposes of obtaining validation information related to the validation request of the person or device 1304. The rules may tell the validation service where to find the address or location of one or more data sources. The rules may point to a local table, array, or any other type of data storage means by which the logical addresses of data stores may be contained. Once a response to the query containing the appropriate validation information is received 1305, the validation information is compared to the rules which provide a means to know whether the person or device is validated and at what level—should more than one or two levels exist, i.e., the rules confirm approval or denial of the validation request based on the validation information which may then be forwarded onto the requester of the validation 1306.

As previously stated, it is anticipated that a local data store may save the results of these validation requests such that any subsequent validation requests matching the initial request may be first retrieved from the local data store thus increasing the speed and efficacy of the request process rather than querying federated data stores each iteration.

Figure 15:
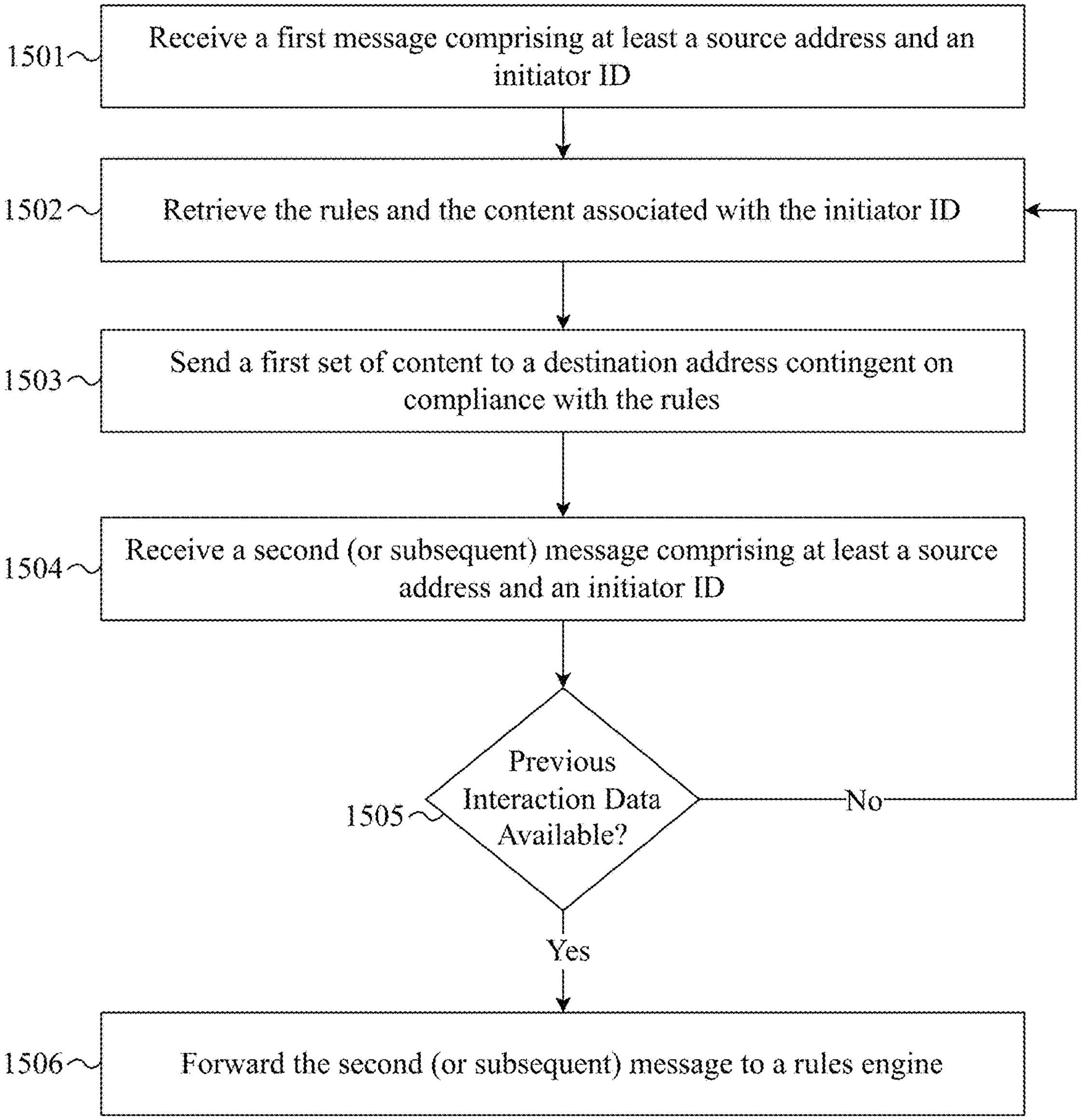
FIG. 15 is a flow diagram illustrating an exemplary method for handling two or more subsequent messages or interactions between a user mobile device and the dynamic-link communication platform, according to an embodiment.

FIG. 15 is a flow diagram illustrating an exemplary method for handling two or more subsequent messages or interactions between a user mobile device and the dynamic-link communication platform, according to an embodiment. According to the embodiment, the process begins at step 1501 when platform 100 receives a first message/interaction comprising at least a source address and an initiator ID. In some aspects, the first message may further comprise metadata associated with the user, the user mobile device, the initiator, or some combination thereof. For example, the metadata which may be included in the first message may be device information (e.g., details about the user's device type and operating system) which can be used to determine an appropriate way to transmit and format content from platform 100 to the mobile device. At step 1502, both rules and content associated with the initiator ID may be retrieved from database 106. Some initiator IDs may not be associated with any rules, in which case only the content associated with it may be retrieved and sent directly to the mobile device. At step 1503, platform 100 can send a first set of content to a destination address contingent on compliance with the retrieved rules (if applicable). As a next step 1504, a second (or subsequent) message/interaction is received from the same user/mobile device, the second message/interaction comprising at least a source address and the initiator ID. In an embodiment, both the first message and subsequent message may be associated with the same initiator/initiator ID. For example, a user may perform a first scan of a QR code for an event, wherein the first scan causes platform 100 to retrieve and/or generate and send a first set of content (e.g., a deep link to page where the user can register for the event) directly to the user's mobile device in the form of an auto-populated text message in the default messaging application on the mobile device. Continuing the example, the user may perform a second scan of the QR code for the same event, but this time platform 100 can utilize stored data and metadata associated with the second scan to identify that the user has already received the first set of content, and then send a second, different set of content (e.g., a deep link to an application which states the event venue dress rules or code of conduct) to the user's mobile device in the form of an auto-populated text message in the default messaging application on the mobile device.

At step 1505, upon receiving the second or subsequent message/interaction platform 100 may perform a check to see if there is any previous interaction data available between the user/mobile device and the platform 100. In some implementations, campaign manager 402 may perform this check by searching/querying database 106 for a record/profile associated with user/mobile device and comparing against any stored historical interaction information. If there is no previous data found in database 106, then this interaction must be a first interaction with a particular initiator and the process loops back to step 1502. If, instead, there is previous interaction data available, then campaign manager 402 may forward the second (or subsequent) message to a rules engine 1402 at step 1506.

Figure 16:
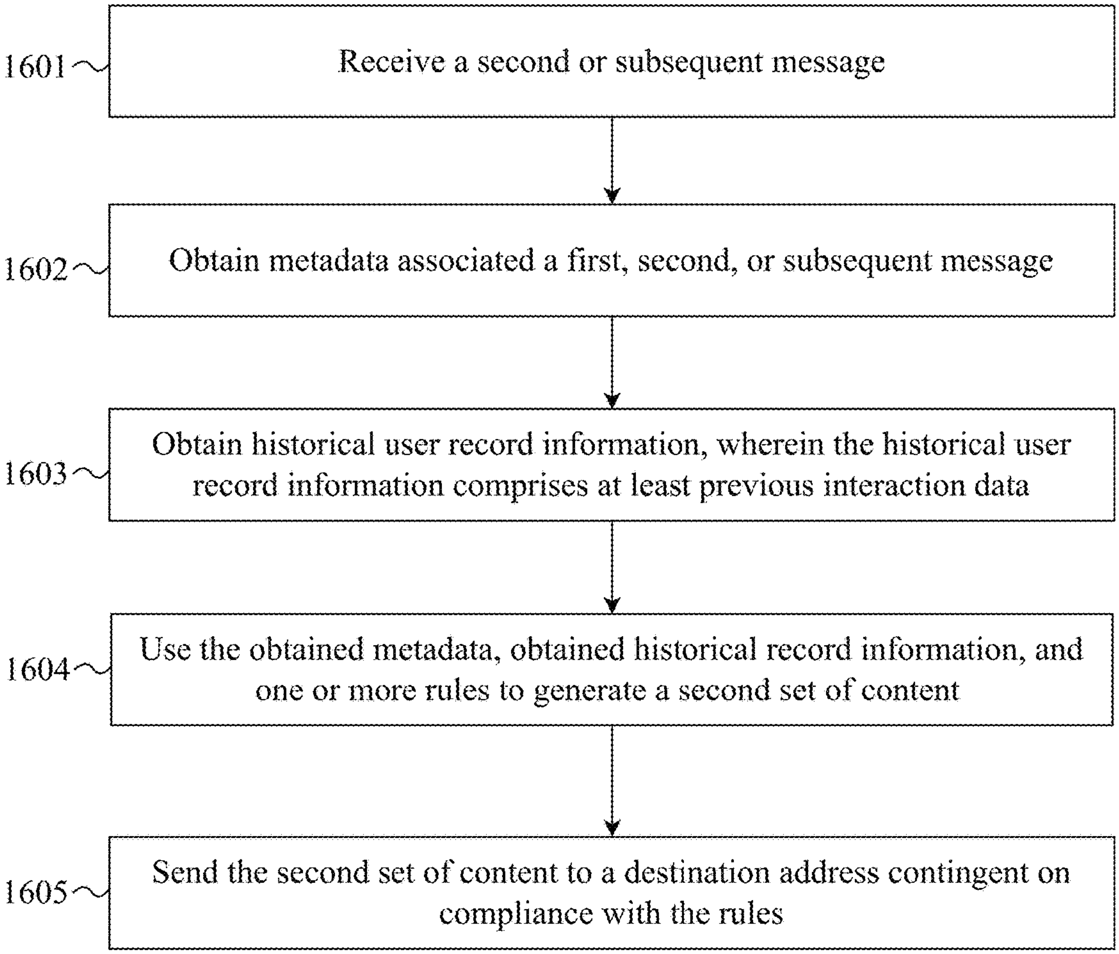
FIG. 16 is a flow diagram illustrating an exemplary method for generating a second set of content for subsequent interactions between a user/mobile device and platform, according to some embodiments.

FIG. 16 a is flow diagram illustrating an exemplary method for generating a second set of content for subsequent interactions between a user/mobile device and platform 100, according to some embodiments. According to an embodiment, the process begins at step 1601 when platform 100 or one or more of its components, such as rules engine 1402, receives a second or subsequent message and/or interaction from a mobile device which has previous and/or historical interaction data associated with the mobile device and is applicable to context of the second or subsequent message/interaction. At step 1602, rules engine 1402 may obtain any metadata associated with a first, the second, or any subsequent message/interaction. Either of the first, second, or subsequent messages may comprise various metadata associated with the initiator, user, device, or context which the subsequent messages were received. As a simple example, metadata may comprise temporal-spatial data which correlates the received subsequent message with specific time and location from which the interaction with an initiator occurred. Metadata may comprise device information, referral source information, time, and context data, and/or the like. Metadata may comprise session context, for example, information about the user's current session, such as items in their shopping cart or content in progress.

At step 1603, rules engine 1402 can obtain historical user record information from database 106, wherein the historical user record information comprises at least previous interaction data between the user/mobile device and platform 100. In some implementations, user record information may further comprise user profile information, previous interactions, purchase history, user activity history, search queries, device information (e.g., type, OS, device orientation, device capabilities, etc.), referral source, time and context data, personal preferences (e.g., language preference), session context (e.g., session duration), app version, social media integration, authentication state (e.g., whether the user is already logged in or needs to authenticate), offline/online status, and/or the like.

At step 1604, rules engine 1402 can use the obtained metadata, obtained historical record information, and one or more rules to generate a second set of content, different from the first set of content which was sent to the mobile device responsive to the first interaction. In some embodiments, the second set of content may comprise a custom-generated deep link. In some implementations, the one or more rules may be set or created by an organization/administrator and uploaded to platform 100 at the same time that an initiator campaign (event or product and any associated rules and content) is uploaded to platform 100. In an embodiment, the uploaded rules for handling subsequent messages/interactions may be hierarchal rules. For example, a first rule may stipulate that if the subsequent message has been received a certain time period (e.g., one week) after a first message, then the second set of content should include a reminder as well as a deep link, however, a second rule may be in place which states that if the second message is received after the user has purchased the product associated with the initiator, then the second set of content should include a post-sale message (e.g., a thank you for the purchase message, a deep link to similar products/services, a deep link to a survey, a deep link to coupon or special promotion, etc.). In this example, the second rule may take precedence over the first rule, and the second set of content may comprise a post-sale message. In this way, rules engine 1402 can obtain the rules, determine the proper rules to apply to remain in compliance with said rules, and then generate the appropriate set of content responsive to a subsequent message/interaction occurring between a mobile device and an initiator.

As a last step 1605, platform 100 can send the second set of content to a destination address contingent on compliance with the rules which govern subsequent interactions after an initial initiator/user interaction.

Figure 17:
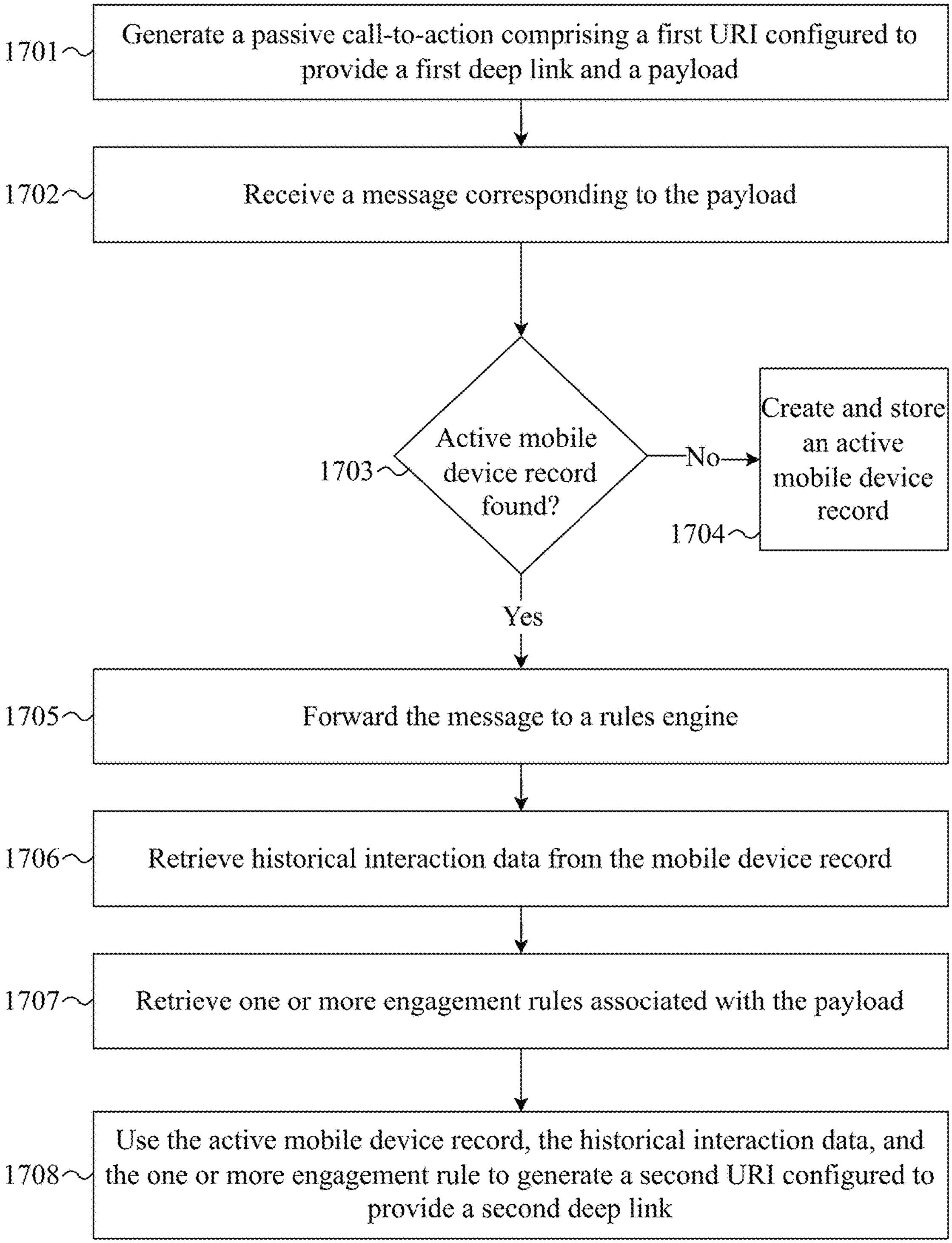
FIG. 17 is a flow diagram illustrating an exemplary method for generating a second set of content for subsequent interactions between a mobile device and platform, according to an embodiment.

FIG. 17 is a flow diagram illustrating an exemplary method for generating a second set of content for subsequent interactions between a mobile device and platform, according to an embodiment. According to an implementation, the process may be executed as one or more sets of programming instructions stored in the memory of a computing device and executed on at least one processor of the computing device. According to the embodiment, the process begins at step 1701 when platform 1400 generates a passive call-to-action comprising a first uniform resource identifier (URI) configured to provide a first deep link to a messaging application on a mobile device and a payload, the payload comprising a pre-populated message suitable for display in the messaging application. The messaging application may be a text message application, an email application, a social media application, a push notification application, or any other suitable messaging application stored and operating on the mobile device. For example, if the pre-populate message is a text message, then the URI may indicate the messaging application is the default messaging application operating one the mobile device. At a next step 1702, platform 1400 can receive a message substantially corresponding to the payload and receive any associated mobile device metadata. At step 1703 a check is made to determine if there is an active mobile device record associated with the mobile device from which the message was received. Database 106 may comprise a plurality of active mobile device records, each of which is associated with a mobile device. If there is no active mobile device record identified in step 1703, then an active mobile device record is created comprising at least the associated mobile device metadata and the created active mobile device record is stored in database 106 at step 1704. In some implementations, a confirmation message may be generated and transmitted to the mobile device, wherein the confirmation message comprises an indication of the creation of an active mobile device record associated with the mobile device. If, instead, an active mobile device record associated with the mobile device exists, then the message may be forwarded to rules engine 1402 at step 1705.

According to the embodiment, rules engine 1402 receives the message and retrieves historical interaction data from the identified mobile device record at step 1706. Rules engine may further retrieve one or more engagement rules associated with the payload from database 106 at step 1707. Each engagement rule may be associated with one or more sets of engagement instructions which can be used with various contextual information to generate a response to a received message. As a last step 1708, rules engine 1402 can use the active mobile device record, the historical interaction data, and the one or more engagement rules to generate a second URI configured to provide a second deep link and a second payload to the messaging application. The second deep link and the second payload being different than the first deep link and first payload.

Figure 20:
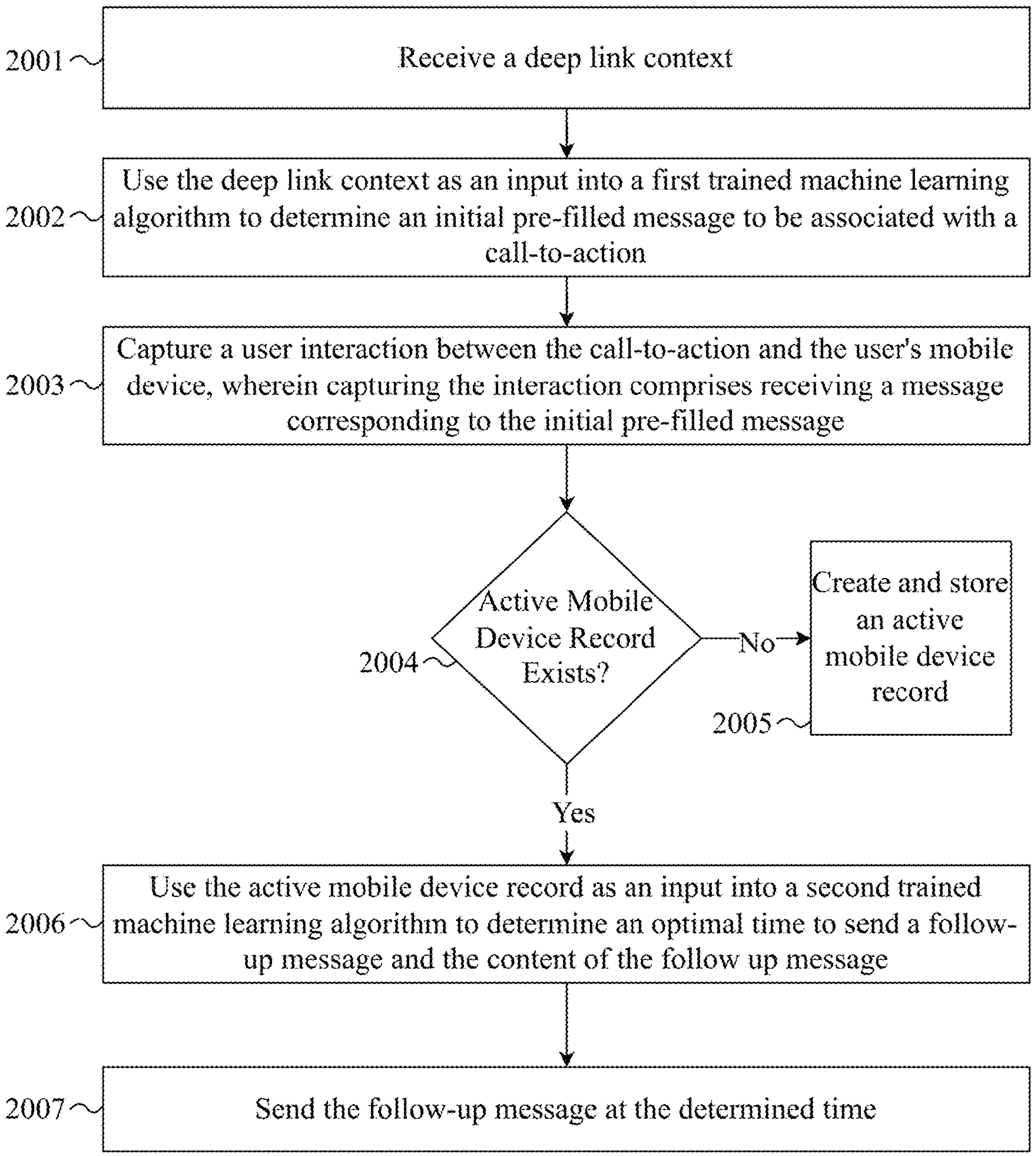
FIG. 20 is a flow diagram illustrating an exemplary method for providing link-initiated user retention and engagement with generative artificial intelligence, according to an embodiment.

FIG. 20 is a flow diagram illustrating an exemplary method for providing link-initiated user retention and engagement with generative artificial intelligence, according to an embodiment. The process begins by generating a call-to-action (also referred to herein as an initiator) for a product, service, and/or event. A call-to-action may comprise a URI configured to provide an pre-filled initial message to be displayed in a messaging application on a mobile device when a user of the mobile device interacts with the call-to-action. A user may interact with a call-to-action (CTA) by using their mobile device. For example, if the CTA is a QR code, the user can scan the QR with their camera on their mobile device to begin an interaction. When a user interacts with a CTA, the interaction is captured by their mobile device and sent to platform 1400 which could be represented as a cloud-based server. The server receives the interaction along with mobile device metadata and checks to see if there is any stored information (e.g., active mobile device record) associated with the mobile device. Any stored data and the mobile metadata may be used as inputs to a machine learning algorithm to generate an initial message to send to the mobile device responsive to the CTA interaction.

A generative artificial intelligence model may be leveraged to generate the content of the initial message such as, for example, a custom-generated deep link and a custom message (i.e., payload). According to the embodiment, the process begins at step 2001 when platform 1400 receives, retrieves, or otherwise obtains a deep link context. Deep link context may be obtained from a campaign stored in database 106 or may be received from a mobile device via metadata, or may be derived or inferred from various other types of data. At step 2002, the deep link context is used as an input into a first machine learning algorithm configured to determine the content of an initial message corresponding to a generated call-to-action. In some implementations, the first machine learning algorithm is a generative artificial intelligence model developed using a LSTM RNN architecture. At step 2003, platform 1400 can capture the user interaction between the call-to-action and the user's mobile device, wherein capturing the interaction comprises receiving a message corresponding to the initial pre-filled message. For example, a user scans a QR code which causes an AI generated, pre-filled message to appear in the text messaging application on the user's mobile device, which the user then sends by hitting the send button on their mobile device. This interaction (the QR scan and sending of the pre-filled message) is captured by platform 1400. At step 2004, a check is made to determine if the mobile device which sent the message/had the interaction has an active mobile device record stored in database 106. If no such record is identified, then an active mobile device record associated with the mobile device is created and stored in database 106 at step 2005. If, instead, an active mobile device record associated with mobile device exists, then the process moves to step 2006 wherein the active mobile device record (and other data) may be used as an input into a second machine learning algorithm to determine an optimal time to send a follow-up message and the content of the follow-up message. As a last step 2007, system then sends the follow-up message at the determined time to the messaging application on the mobile device.

Figure 21:
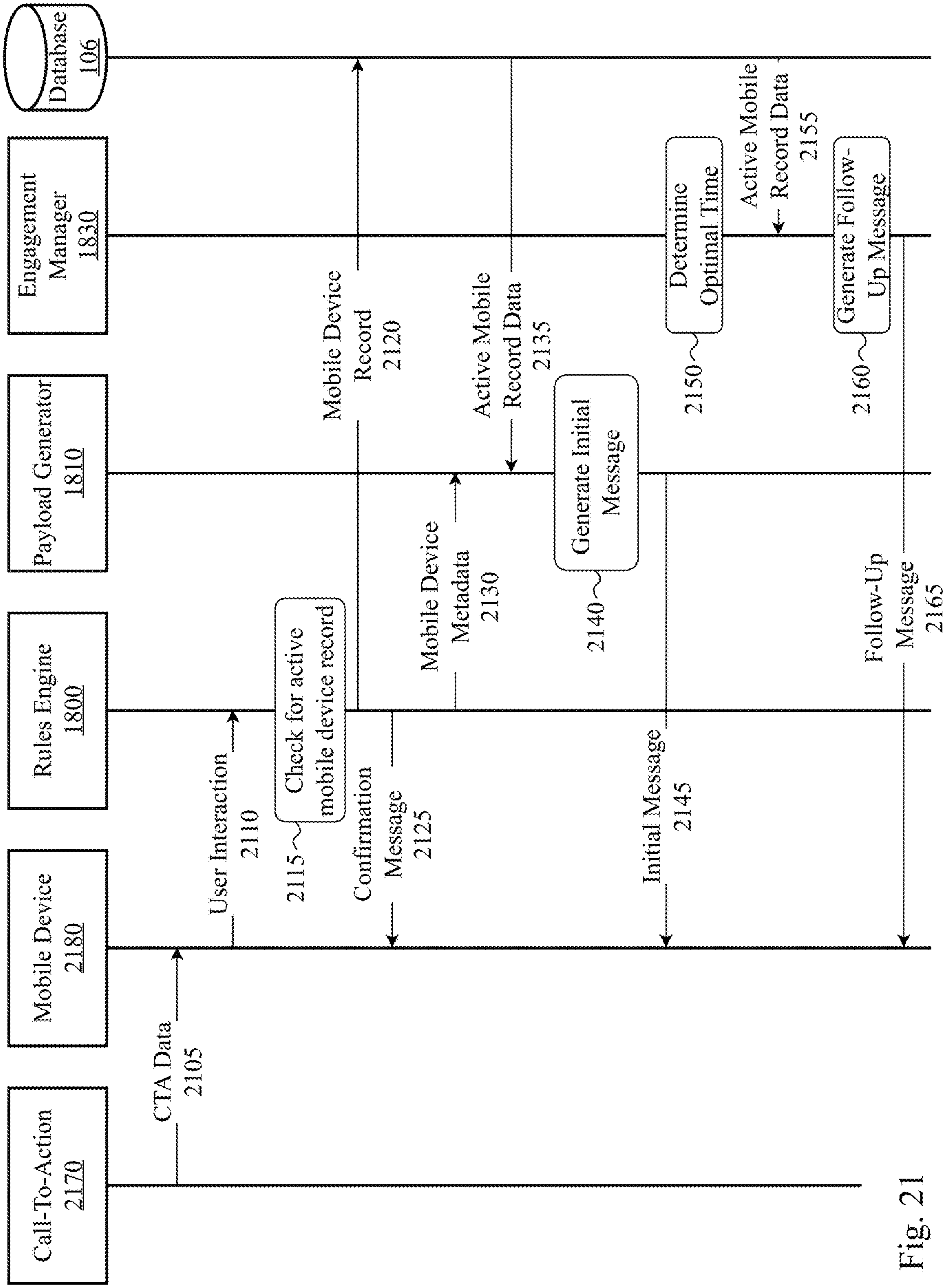
FIG. 21 is a message flow diagram illustrating an exemplary exchange of data when performing link-initiated user engagement and retention using AI, according to an embodiment.

FIG. 21 is a message flow diagram illustrating an exemplary exchange of data when performing link-initiated user engagement and retention using AI, according to an embodiment. According to the embodiment, a call-to-action (CTA) is present and existing somewhere out in the world, wherein it may be interacted with by a user mobile device. The CTA (also referred to herein as an initiator) may be in various forms or formats suitable for display in both digital and non-digital formats. For simplicities sake, the exemplary exchange of messages illustrated in FIG. 21 may be associated with a CTA that is in the form of a QR code. A user with a mobile device 2180 can interact with the CTA 2170 such as by scanning the QR code with the camera on the mobile device. As a result of the scan, a URI (or URL) may be displayed on the mobile device as well as CTA data may be provided 2105 to the mobile device. The CTA data may comprise deep link context or other types of contextual information associated with the CTA which can be used by platform 1400 or some of its components to identify an initiator campaign associated with the CTA. The user of mobile device 2180 can interact with the displayed URI by clicking, tapping, swiping, or some other type of action. This user interaction 2110 is captured by the mobile device and sent platform 1400 where it can be routed to rules engine 1800. User interaction may comprise mobile device metadata as well as deep link context, according to some embodiments. At rules engine 1800 a check 2115 is made to determine if there is an active mobile device record associated with the mobile device from which the user interaction was received. If there is no active mobile device record associated with the mobile device, then the system creates and stores 2120 an active mobile device record in database 106 and sends a confirmation message 2125 to the user mobile device indicating that an active mobile device record has been created. If, instead, an active mobile device record associated with the user's mobile device exists, then the system can forward the mobile device metadata 2130 to payload generator 1810 which can use a trained machine learning algorithm and active mobile record data 2135 to generate an initial message 2140 to be sent to mobile device 2180 responsive to a user interacting with the CTA 2170. The trained machine learning algorithm may use the mobile device metadata, deep link context, and active mobile device record to generate a personalized initial message. The initial message may comprise a custom-generated deep link and a payload. In some implementations, the payload may comprise a pre-populated message configured to be displayed in a messaging application on the mobile device 2180. The initial message is sent 2145 to mobile device.

At engagement manager 1830 is a second trained machine learning algorithm configured to determine and optimal time 2150 at which to send a follow-up message to mobile device 2180. When such a time is determined, engagement manager 1830 can retrieve 2155 active mobile device record information associated with the mobile device 2180 and use it as an input into the second machine learning algorithm to generate the content of the follow-up message 2160. The system may then send the follow-up message at the determine time 2165 to the mobile device where it may be displayed in a messaging application.

Figure 23:
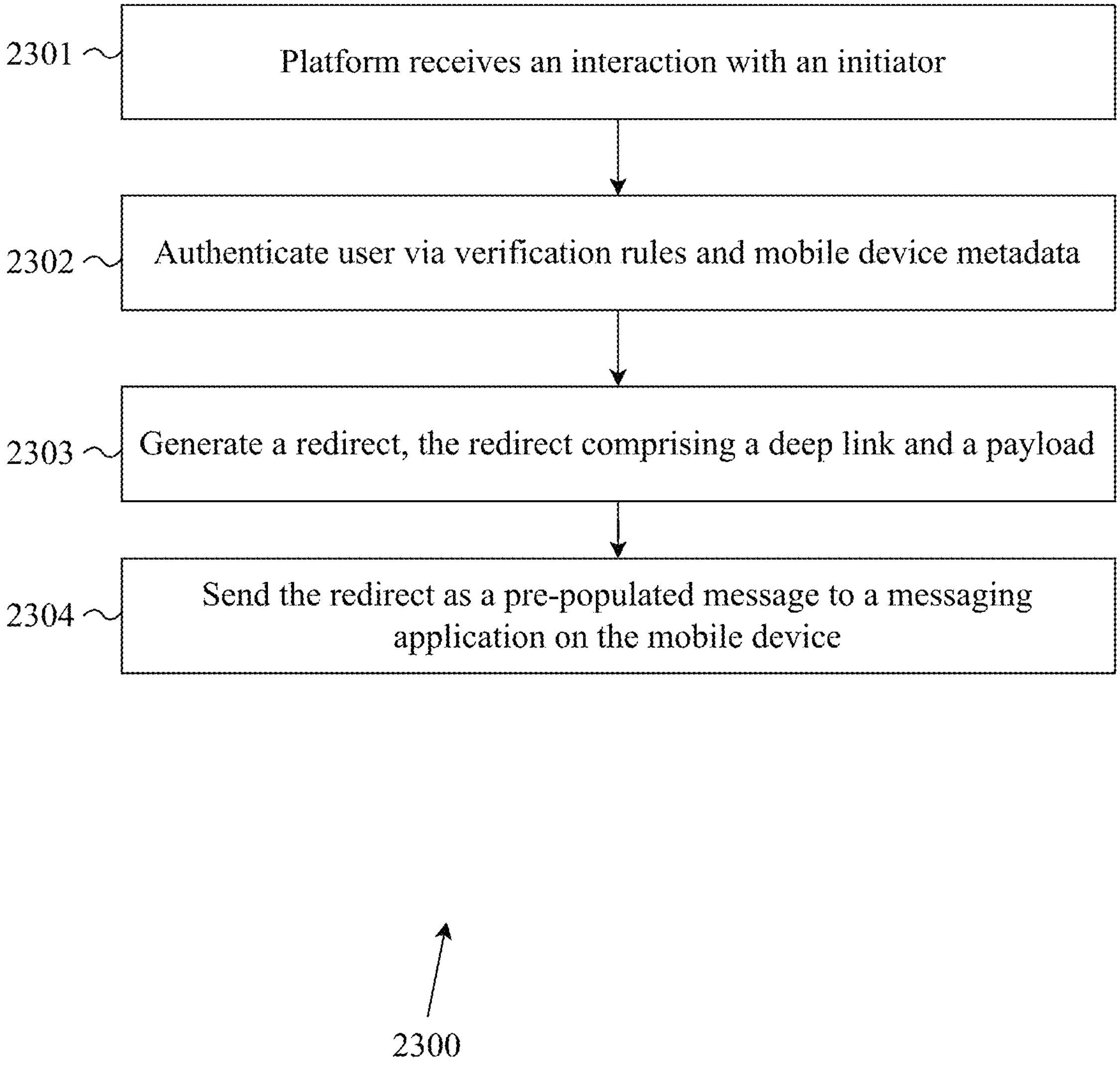
FIG. 23 is a flow diagram illustrating an exemplary method for providing link-initiated secure voting, according to an embodiment.

FIG. 23 is a flow diagram illustrating an exemplary method 2300 for providing link-initiated secure voting, according to an embodiment. According to the embodiment, the process begins at step 2301 when platform (e.g., platform 1400) receives an interaction with an initiator such as, for example, scanning a QR code associated with a voting event or to leave a user review (as a review may be broadly categorized as a type of vote (or other type of expression of opinion or choice)) wherein scanning the QR code causes a pop-up to appear which may obtain consent to redirect the user. When the user provides consent (e.g., by tapping the screen of their mobile device) is what is referred to as the interaction with the initiator. A next step 2302 by the platform is to authenticate the user via verification rules and mobile device metadata which was received during the user interaction (i.e., submission of consent). Verification rules may be associated with a campaign. User/device validation data may be stored in validation database 1202. At step 2303, redirect module 2210 can generate a redirect, the redirect comprising a deep link and a payload. The deep link may be configured to cause a pre-populated message comprising the payload to be displayed in a messaging application on the user mobile device. In some embodiments, the payload comprises ready-to-send user review comments. In some implementations, the payload comprises a ready-to-send vote. The pre-populated message may be addressed to an appropriate redirect address. For example, if the pre-populated message is a user review, then the message, when sent, may be redirected to a customer relationship management (CRM) system associated with an enterprise or organization. In some implementations, the redirect and/or payload may comprise a unique toll-free number and instructions or descriptive text associated with the unique toll-free number and the voting event/user review associated with the initiator. As a last step 2304, the platform sends the redirect as a pre-populated message to a messaging application on the mobile device.

Figure 24:
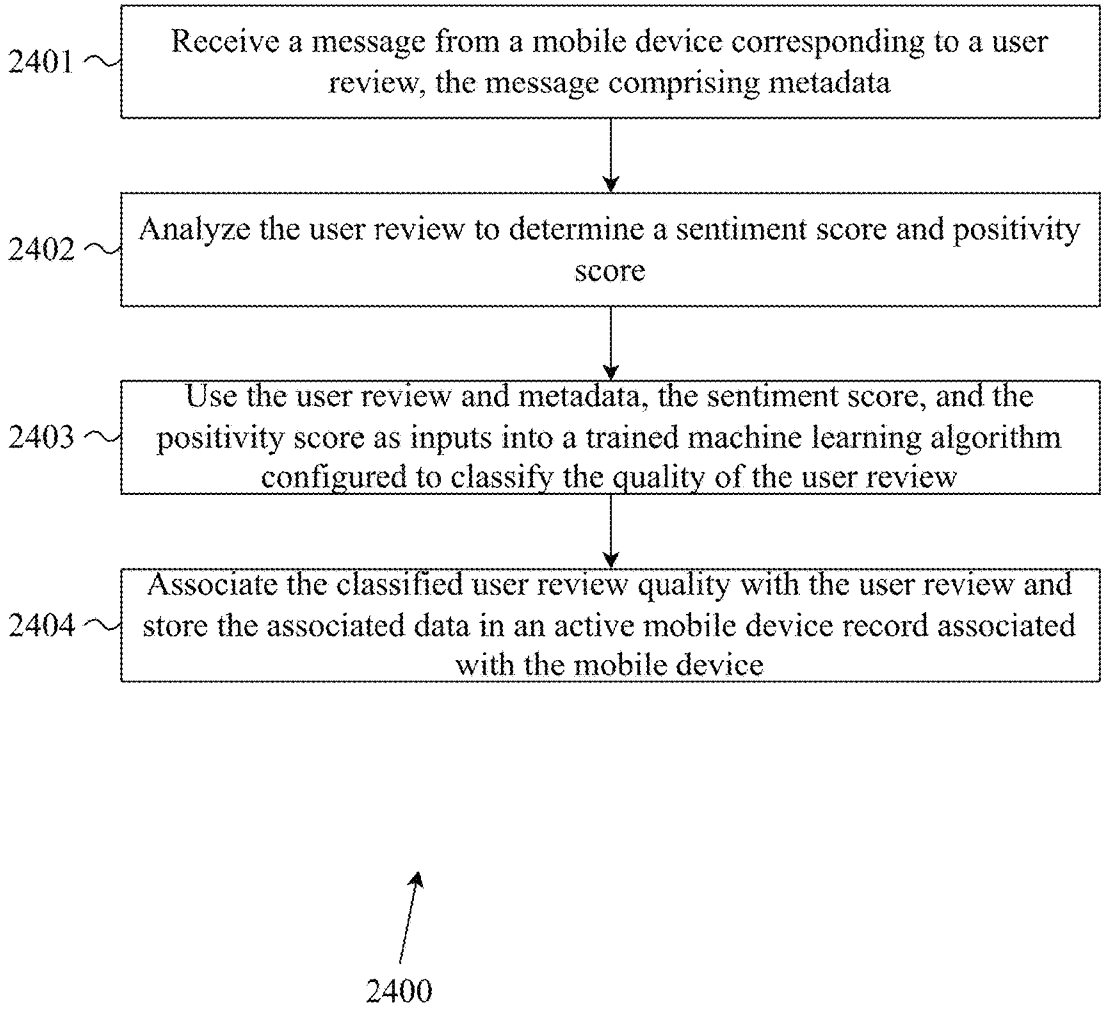
FIG. 24 is a flow diagram illustrating an exemplary method for determining the quality of a user review, according to an embodiment.

FIG. 24 is a flow diagram illustrating an exemplary method 2400 for determining the quality of a user review, according to an embodiment. According to the embodiment, the process begins at step 2401 when the platform receives a message from a mobile device corresponding to a user review, the message comprising metadata. At step 2402, a trained machine learning algorithm configured to determine sentiment and positivity associated with a user review is used to analyze the user received user review to determine a sentiment score and a positivity score associated with the user comment. At step 2403, the user review and is associated metadata, the sentiment score, and the positivity score are used as inputs into a trained machine learning algorithm configured to classify the quality of the user review. As a last step 2404, the platform associates the classified user review quality with the user review and stores the associated data in an active mobile device record associated with the mobile device.

Figure 25:
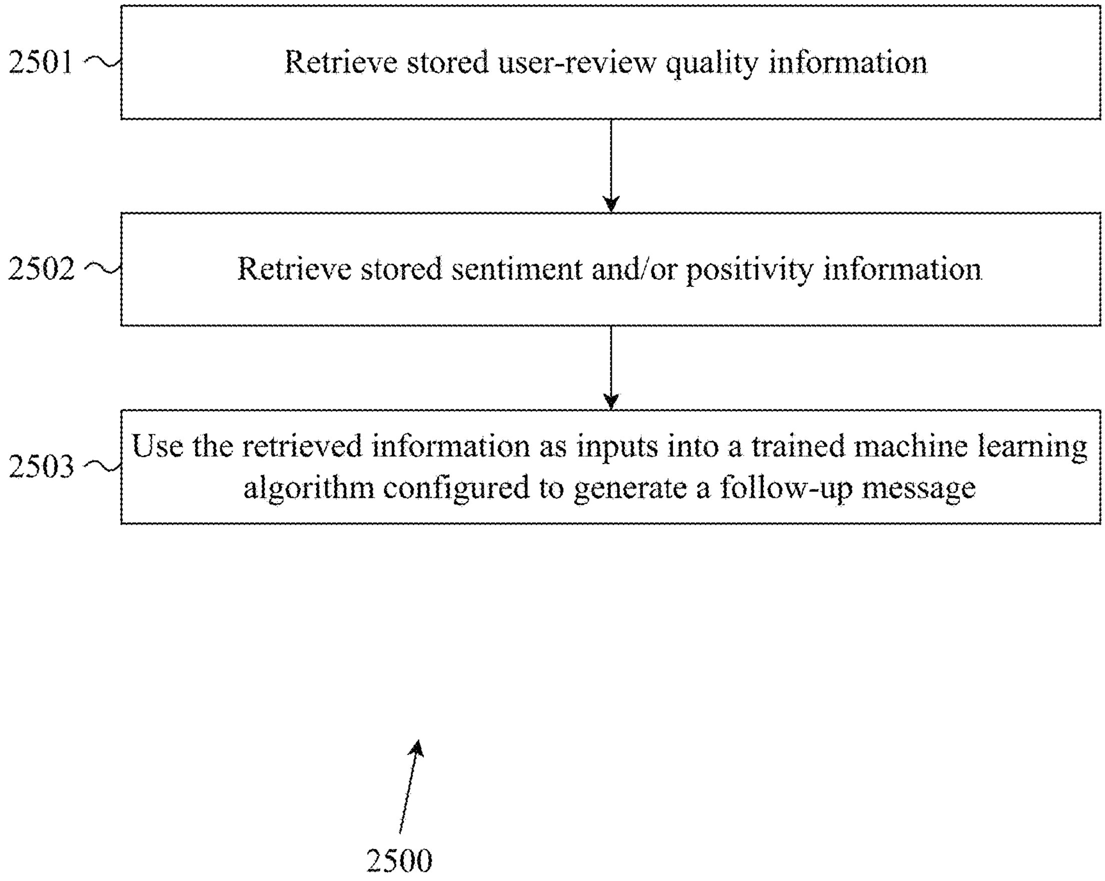
FIG. 25 is a flow diagram illustrating an exemplary method for generating a follow-up message to a received message, according to an embodiment.

FIG. 25 is a flow diagram illustrating an exemplary method 2500 for generating a follow-up message to a received message, according to an embodiment. Engagement manager 2225 may be configured to execute this process in order to generate a follow-up message corresponding to a received user review. According to the embodiment, the process begins at step 2501 when engagement manager 2225 receives, retrieves, or otherwise obtains stored user-review quality classification information. This information may be retrieved from database 2230. As a next step 2502, engagement manager 2225 can receive, retrieve, or otherwise obtain stored sentiment and/or positivity information. This information can include stored sentiment/positivity classifications associated with a user review or multiple user reviews. As a last step 2503, the obtained data is used as inputs into a trained machine learning algorithm configured to generate a follow-up message. For example, if the user has negative sentiment towards a product, but overall remains positive towards the company that makes the product, then a follow-up message may comprise an offer for different, but related product from that company which may be relevant to the mobile device user.

It should be appreciated that engagement manager 2225 can also obtain information associated with a user/mobile device and a voting event and generate a follow-up message to a submitted vote. For example, if a voting event has a rule which indicates an individual can vote multiple times with a cooldown period between vote casting (e.g., 15 minutes, 1 hour, 24 hours, etc.), then the follow-up message generated may notify the user that they are eligible to vote again as the cooldown period has expired. As another example, a user may interact with a voting event initiator, but never send the pre-populated redirect from their mobile device (e.g., due to the user forgetting, or losing interest, etc.). In this instance, the follow-up message may be a reminder message saying they can still vote.

Figure 26:
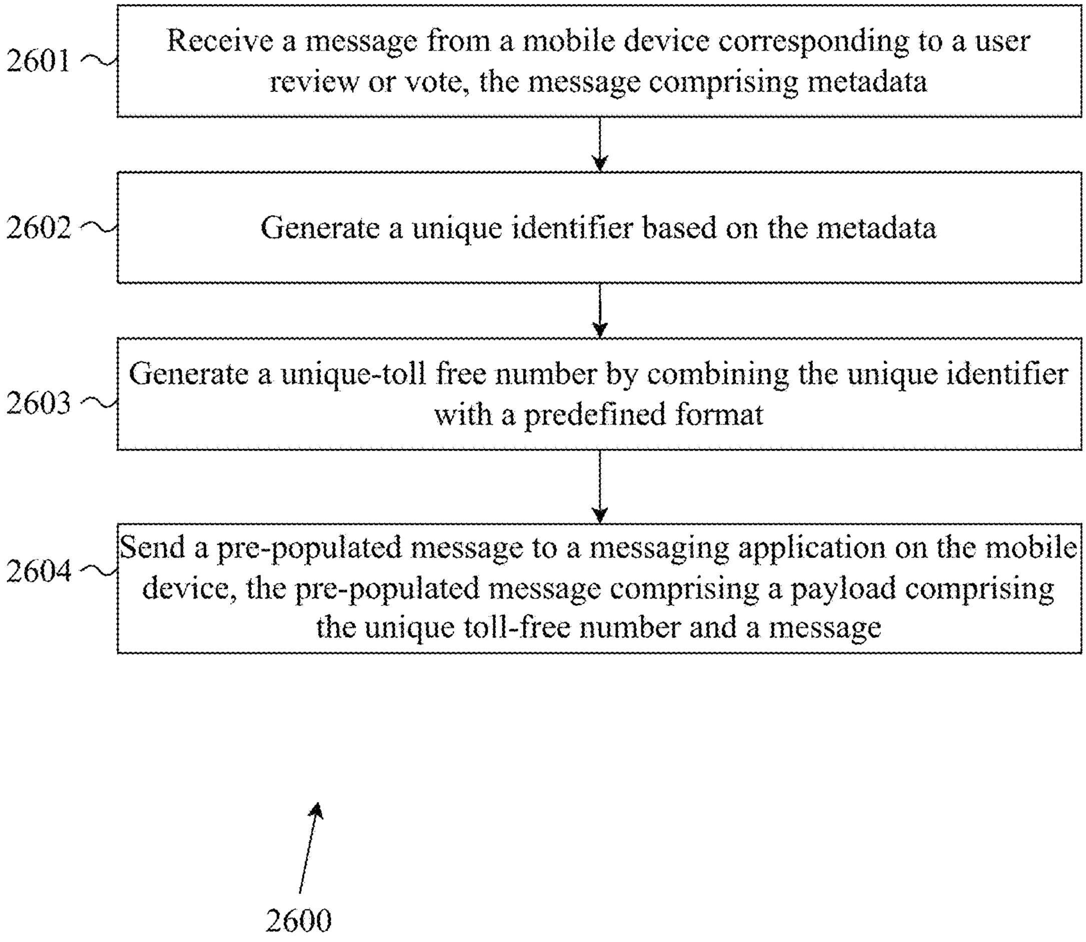
FIG. 26 is a flow diagram illustrating an exemplary method for generating a unique toll-free number, according to an embodiment.

FIG. 26 is a flow diagram illustrating an exemplary method 2600 for generating a unique toll-free number, according to an embodiment. In various implementations, a pre-populated message may comprise a redirect. In some embodiments, the redirect comprises a unique toll-free number that, when dialed, is configured to guide a mobile device user though a voting or review process. According to the embodiment, the process begins at step 2601 when the platform receives a message from a mobile device corresponding to a user review or vote, the message comprising metadata. The message may be an initial interaction message (e.g., a consent message). At step 2602, number generator 2215 generates a unique identifier based on the metadata. For example, a hashing algorithm (e.g., SHA-256, SHA-3) may be used to generate a hash value to represent the unique identifier. At step 2603, number generator 2215 can generate a unique toll-free number by combining the unique identifier with a predefined format. As a last step 2604, the platform sends a pre-populated message to a messaging application on the mobile deice, the pre-populated message comprising a payload comprising the unique toll-free number and a message. In this way, in some implementations, when a user interacts with an initiator associated with a voting event or review process, they may receive a unique toll-free number which they can use to be redirected to an appropriate endpoint to cast a vote or submit a review.

Figure 27:
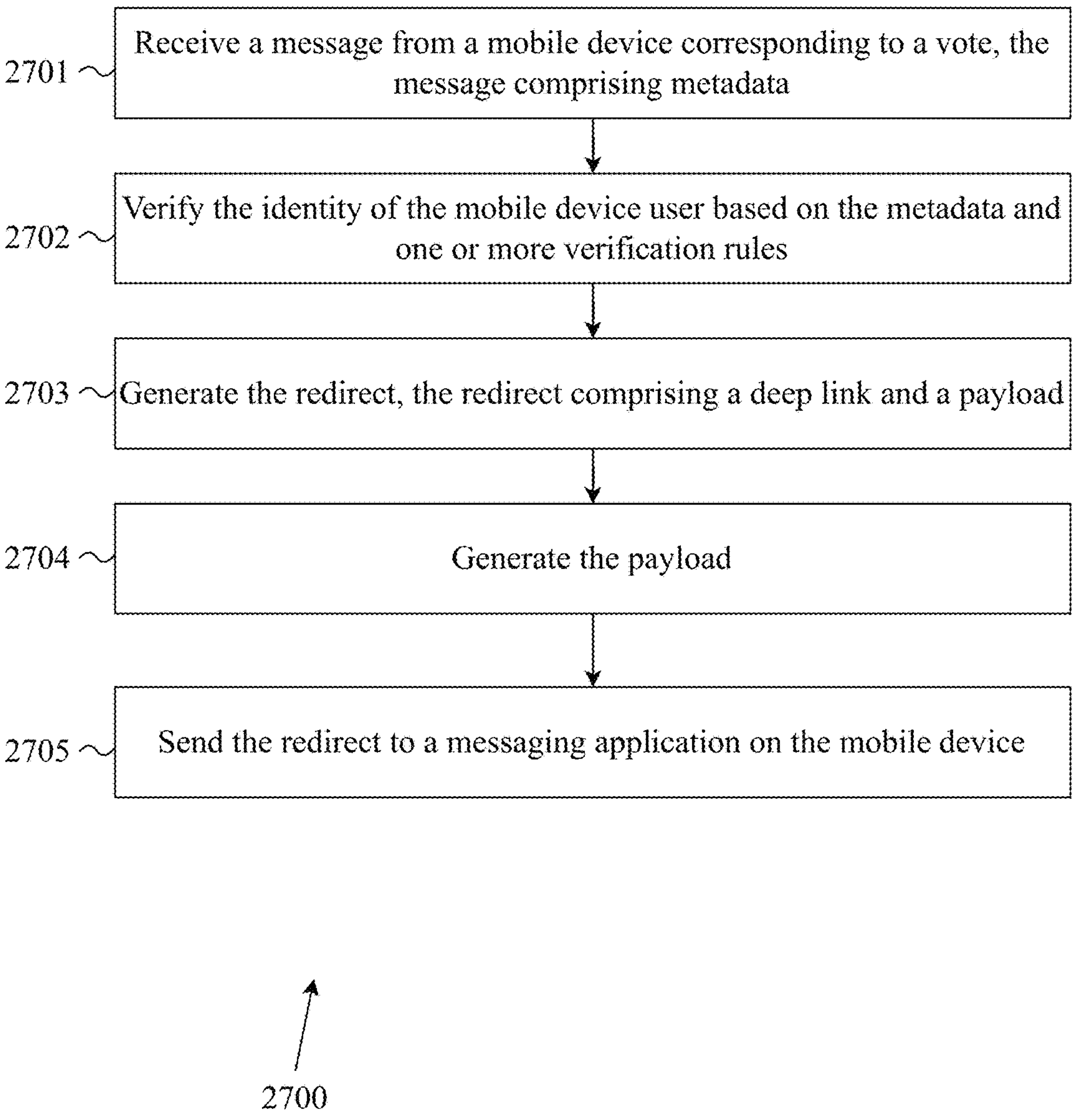
FIG. 27 is a flow diagram illustrating an exemplary method for providing secure voting, according to an embodiment.

FIG. 27 is a flow diagram illustrating an exemplary method 2700 for providing secure voting, according to an embodiment. According to the embodiment, the process begins at step 2701 when the platform receives a message from a mobile device corresponding to a voting event, the message comprising metadata. The message may be an interaction message (e.g., a consent message). At step 2702, the system verifies the identity of the mobile device user based on the received metadata and one or more verification rules. The verification rules may be stored as part of a campaign associated with the voting event. Mobile device user validation information may be obtained from validation database(s) 1202 to facilitate user authentication. As a next step 2703, redirect module 2210 can generate a redirect, the redirect comprising a deep link and a payload. The deep link may be configured to display the payload as a pre-populated message in a messaging application on the user's mobile device. The pre-populated message may be addressed to a redirect endpoint. The pre-populated message may comprise a redirect in the form of a unique toll-free number. At step 2704, the payload may be generated. In some embodiments, the payload may comprise a redirect in the form of a unique toll-free number or a deep link to a voting portal endpoint. In some embodiments, the payload comprises a ready-to-send vote. As a last step 2705, the platform can send the redirect to a messaging application on the mobile device.

It should be appreciated that the verification step described in step in method 2700 can be applied to each method described herein which receives an interaction message from a mobile device. For example, the verification step could be applied to method 2400 after the message is received at step 2401. Whether an authentication step is required may be determined by one or more rules which may be stored as campaign details in database 2230.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 28:
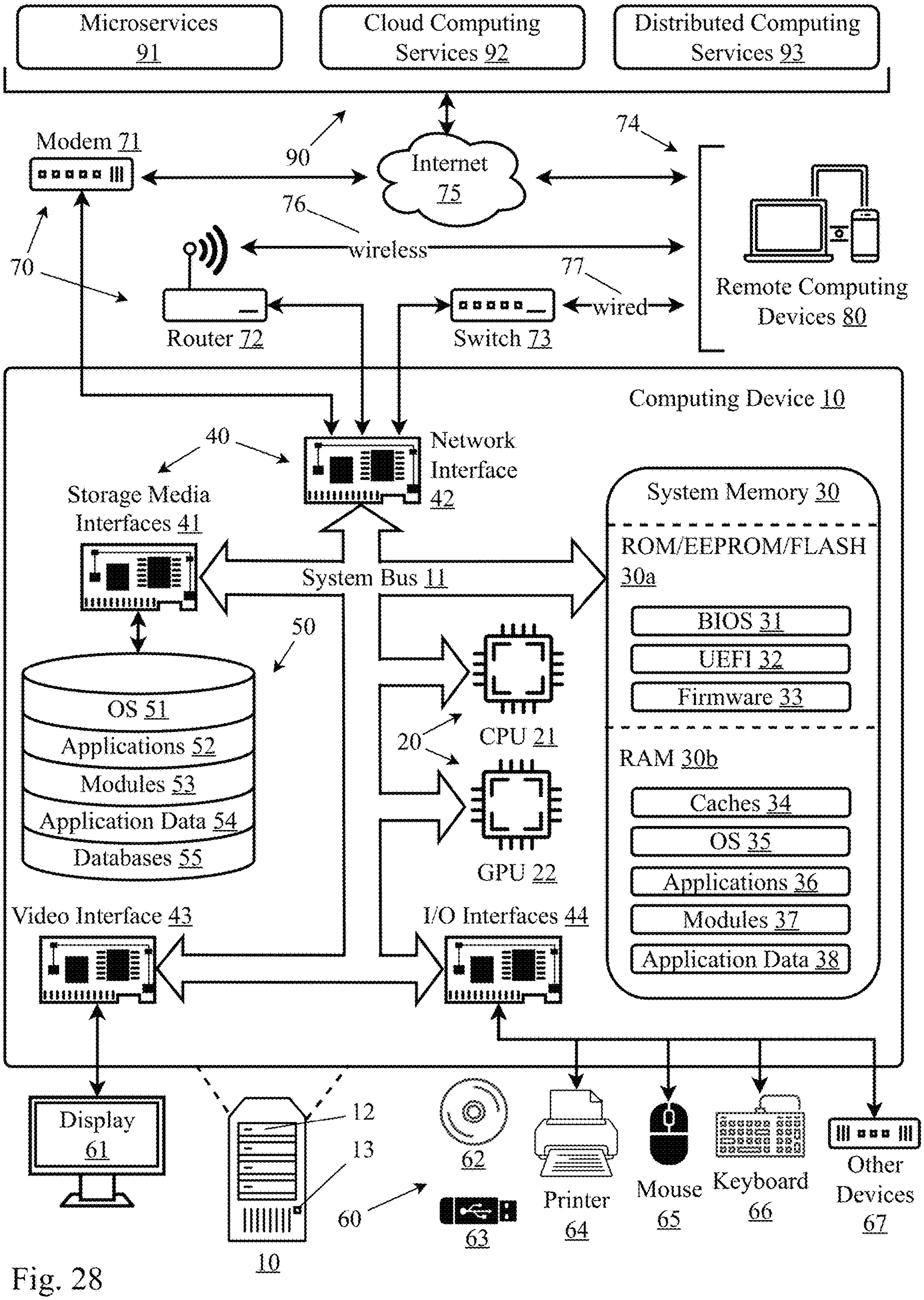
FIG. 28 illustrates an exemplary computing environment on which an embodiment described herein may be implemented, in full or in part.

FIG. 28 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed, or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

What is claimed is:

1. A system for link-initiated secure voting and review, comprising:

a first trained machine learning algorithm configured to analyze the content of a user review to determine a sentiment score; and a computing device comprising a processor, a memory, and a first plurality of programming instructions stored in the memory and operable on the processor, wherein the first plurality of programming instructions, when operating on the processor, cause the computing device to:

receive a user interaction from a mobile device substantially corresponding to a call-to-action associated with a voting event or user review process and a mobile device metadata;

authenticate an identity of a user of the mobile device using one or more verification rules associated with a campaign corresponding to the call-to-action, wherein the one or more verification rules and user validation data associated with the mobile device are stored in a validation database;

generate a unique identifier associated with the mobile device by applying a hashing algorithm to the mobile device metadata;

combine the unique identifier with a pre-defined format to generate a unique toll-free number;

responsive to user authentication, generate a redirect comprising a deep link and a payload comprising the unique toll-free number, wherein the redirect is configured to auto-populate a message on a messaging application on the mobile device;

receive a user review message from the mobile device;

use the user review and the mobile device metadata as inputs into the first trained machine learning algorithm to determine a sentiment score associated with the user review; and send a follow-up message to the mobile device based on the sentiment score.

2. The system of claim 1, further comprising a second trained machine learning algorithm configured to analyze the content of a user review to determine a positivity score; and wherein the computing device is further configured to use the user review and the mobile device metadata as inputs into the second trained machine learning algorithm to determine a positivity score associated with the user review.

3. The system of claim 2, further comprising a third trained machine learning algorithm configured to generate the follow-up message; and wherein the computing device is further configured to:

use the user review, the mobile device metadata, the sentiment score, and the positivity score as inputs into the third trained machine learning algorithm to generate the follow-up message.

4. The system of claim 1, further comprising a number generator comprising a second plurality of programming instructions stored in the memory and operable on the processor, wherein the first plurality of programming instructions, when operating on the processor, cause the computing device to:

generate a unique identifier associated with the mobile device;

combine the unique identifier with a pre-defined format to generate a unique toll-free number; and wherein the payload comprises the generated unique toll-free number.

5. The system of claim 1, wherein the payload comprises a ready-to-send user review.

6. The system of claim 1, wherein the payload comprises a ready-to-send vote.

7. The system of claim 2, further comprising a fourth trained machine learning algorithm configured to classify a quality of the user review.

8. The system of claim 7, wherein the user review and mobile device metadata, the sentiment score, and the positivity score are used as inputs into the fourth trained machine learning algorithm to classify the quality of the user review.

9. The system of claim 8, wherein the follow-up message is further based on the quality of the user review.

10. A method for link-initiated secure voting and review, comprising the steps of:

training a first machine learning algorithm configured to analyze the content of a user review to determine a sentiment score;

receiving a user interaction from a mobile device substantially corresponding to a call-to-action associated with a voting event or user review process and a mobile device metadata;

authenticating an identity of a user of the mobile device using one or more verification rules associated with a campaign corresponding to the call-to-action, wherein the one or more verification rules and user validation data associated with the mobile device are stored in a validation database;

generating a unique identifier associated with the mobile device by applying a hashing algorithm to the mobile device metadata;

combining the unique identifier with a pre-defined format to generate a unique toll-free number;

responsive to user authentication, generating a redirect comprising a deep link and a payload comprising the unique toll-free number, wherein the redirect is configured to auto-populate a message on a messaging application on the mobile device;

receiving a user review message from the mobile device;

using the user review and the mobile device metadata as inputs into the first trained machine learning algorithm to determine a sentiment score associated with the user review; and sending a follow-up message to the mobile device based on the sentiment score.

11. The method of claim 10, further comprising the steps of:

training a second trained machine learning algorithm configured to analyze the content of a user review to determine a positivity score; and using the user review and the mobile device metadata as inputs into the second trained machine learning algorithm to determine a positivity score associated with the user review.

12. The method of claim 11, further comprising the steps of:

training a third trained machine learning algorithm configured to generate the follow-up message; and using the user review, the mobile device metadata, the sentiment score, and the positivity score as inputs into the third trained machine learning algorithm to generate the follow-up message.

13. The method of claim 10, further comprising the steps of:

generating, using a number generator, a unique identifier associated with the mobile device;

combining, using the number generator, the unique identifier with a pre-defined format to generate a unique toll-free number; and wherein the payload comprises the generated unique toll-free number.

14. The method of claim 10, wherein the payload comprises a ready-to-send user review.

15. The method of claim 10, wherein the payload comprises a ready-to-send vote.

16. The method of claim 11, further comprising the step of training a fourth trained machine learning algorithm configured to classify a quality of the user review.

17. The method of claim 16, wherein the user review and mobile device metadata, the sentiment score, and the positivity score are used as inputs into the fourth trained machine learning algorithm to classify the quality of the user review.

18. The method of claim 17, wherein the follow-up message is further based on the quality of the user review.

* * * * *